(12) United States Patent
Miyazaki

(10) Patent No.: US 8,610,740 B2
(45) Date of Patent: Dec. 17, 2013

(54) INFORMATION PROCESSING APPARATUS, INFORMATION PROCESSING METHOD, PROGRAM, AND INFORMATION PROCESSING SYSTEM

(75) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 12/849,103

(22) Filed: Aug. 3, 2010

(65) Prior Publication Data

US 2011/0050567 A1   Mar. 3, 2011

(30) Foreign Application Priority Data

Sep. 3, 2009   (JP) ................................ P2009-204016

(51) Int. Cl.
*G09G 5/00*   (2006.01)
*G06F 3/048*   (2013.01)

(52) U.S. Cl.
USPC ........... 345/619; 345/357; 345/672; 345/681; 345/680; 715/856; 715/859; 715/861; 715/860

(58) Field of Classification Search
USPC ................. 345/156–184, 619–629, 672–682; 715/764, 857–863
See application file for complete search history.

(56) References Cited

U.S. PATENT DOCUMENTS

| | | | |
|---|---|---|---|
| 6,188,405 B1 * | 2/2001 | Czerwinski et al. | 715/764 |
| 2006/0288314 A1 * | 12/2006 | Robertson | 715/863 |
| 2007/0044036 A1 * | 2/2007 | Ishimura et al. | 715/810 |
| 2007/0168888 A1 * | 7/2007 | Jawerth | 715/857 |
| 2009/0058801 A1 * | 3/2009 | Bull | 345/157 |
| 2009/0135178 A1 * | 5/2009 | Aihara et al. | 345/419 |
| 2009/0187824 A1 * | 7/2009 | Hinckley et al. | 715/711 |

FOREIGN PATENT DOCUMENTS

JP   2001-209495   8/2001

* cited by examiner

*Primary Examiner* — Kent Chang
*Assistant Examiner* — William Lu
(74) *Attorney, Agent, or Firm* — Sherr & Jiang, PLLC

(57) ABSTRACT

There is provided an information processing apparatus including an attention object selection section which selects, from pieces of object position information, information indicating the closest position from a position indicated by new cursor position information as new attention object position information indicating a position of an object that is to be newly attended to, and a focus position control section which causes a focus to be displayed at a position on a display surface indicated by the object position information specified by attention information, and also causes the focus to move to a position on the display surface indicated by the new attention object position information.

12 Claims, 19 Drawing Sheets

K: DRAG (SPEED: NORMAL)
L: DRAG (SPEED: HIGH)
M1, M2: LONG PRESSING

INFORMATION PROCESSING APPARATUS, INFORMATION PROCESSING METHOD, PROGRAM, AND INFORMATION PROCESSING SYSTEM

BACKGROUND OF THE INVENTION

1. Field of the Invention

The present invention relates to an information processing apparatus, an information processing method, a program, and an information processing system.

2. Description of the Related Art

Nowadays, there are many information processing systems each including an information input apparatus which accepts input of information from a user and an information processing apparatus which executes processing in accordance with the information received from the information input apparatus. The information processing apparatus causes the following to be displayed on, for example, a display surface provided thereto: a screen in which objects such as a text box, a button, and a link are pasted (e.g., Web page). In order to select a desired object from the displayed objects, the user inputs information for selecting the desired object to the information input apparatus. The information processing apparatus determines which object was selected by the user in accordance with, for example, the information for selecting the desired object which is received from the information input apparatus. There are various technologies for inputting the information for selecting the desired object by the user to the information input apparatus.

For example, in order that the user can select the desired object, there is a technology for determining that an object to which a cursor points is the desired object. In this technology, for example, the user can specify a direction and a distance along the direction by the direction in which an operating tool such as a finger is moved on a touch panel provided to an information input apparatus and the distance along that direction. Further, for example, the user can also specify a direction and a distance along the direction by the direction in which a mouse provided to the information input apparatus is moved and the distance along that direction. An information processing apparatus causes a cursor to move on the display surface in accordance with, for example, the direction and the distance input to the information input apparatus by the user, determines that the object to which the cursor points is a desired object, and displays a focus on the desired object.

Further, in order that the user can select the desired object, there is a technology for inputting a direction to an information input apparatus by the user using a 5-way key or the like. In this technology, for example, it is necessary that the user input any one of left, right, up, and down directions by using the 5-way key or the like to the information input apparatus. An information processing apparatus causes the focus to move to a new object based on a position currently being focused on and any one of the left, right, up, and down directions that is transmitted from the information input apparatus.

In addition, for example, there is also disclosed a technology (Japanese Patent Application Laid-Open No. 2001-209495) in which, when a user presses one of the left, right, up, and down directions on an arrow key provided to an information input apparatus, an information processing apparatus causes a cursor to move in the direction that the user presses. Accordingly, it becomes possible that a user who is unfamiliar with the operation of a mouse easily move a cursor.

SUMMARY OF THE INVENTION

However, in the technology for determining that an object to which a cursor points is the desired object, it is necessary that the user move, while watching a cursor displayed on a display surface, the cursor onto a desired object. Therefore, there was an issue that it was difficult to adjust a direction and a distance to be input to an information input apparatus in some occasions. The adjustments thereof are particularly difficult when the movement distance of the cursor displayed by an information processing apparatus is overwhelmingly large compared to the distance input to an information input apparatus by a user, such as the case where a touch panel is small and a display surface is large.

Further, in the technology for inputting a direction to an information input apparatus by using a 5-way key or the like, there was an issue that it was difficult for a user to determine which of the left, right, up, and down directions, based on an object currently being focused on, a direction of a desired object corresponds to. The determination of the object is particularly difficult when layout design of objects is highly flexible, such as that of objects pasted onto a Web page. Further, even when the user makes the determination and then inputs any one of the left, right, up, and down directions, there is a case where the determination is actually erroneous and hence the focus does not move to the desired object. Therefore, a burden is imposed on the operation of the user.

In light of the foregoing, it is desirable to provide a novel and improved technology which enables a user to easily input information for selecting a desired object from among objects displayed on a display surface.

According to an embodiment of the present invention, there is provided an information processing apparatus which includes a display section which has a display surface and is capable of displaying information on the display surface, a storage section which stores pieces of object position information indicating positions of a plurality of objects on the display surface, and also stores cursor position information indicating a position of a cursor on the display surface and attention information for specifying at least one of the pieces of object position information, an object display control section which causes the plurality of objects to be displayed at the positions on the display surface indicated by the pieces of object position information, a reception section which receives, from an information input apparatus which accepted input of a vector on the display surface, the vector, a cursor position determination section which determines new cursor position information based on the vector received by the reception section, a cursor display control section which causes the cursor to be displayed at a position on the display surface indicated by the cursor position information stored in the storage section, and also causes the cursor to move to a position on the display surface indicated by the new cursor position information determined by the cursor position determination section, an attention object selection section which selects, from the pieces of object position information, information indicating the closest position from the position indicated by the new cursor position information as new attention object position information indicating a position of an object that is to be newly attended to, and a focus position control section which causes a focus to be displayed at a position on the display surface indicated by the object position information specified by the attention information, and also causes the focus to move to a position on the display surface indicated by the new attention object position information.

The cursor position determination section may determine the new cursor position information based on the cursor position information stored in the storage section and the vector received by the reception section.

The cursor position determination section may determine the new cursor position information by adding the vector received by the reception section to the cursor position information stored in the storage section.

The attention object selection section may acquire object position information indicating the closest position from the position indicated by the new cursor position information from among the pieces of object position information, and when a distance between the positions indicated by the acquired object position information and the new cursor position information, respectively, is larger than a threshold value, the attention object selection section may not use the acquired object position information as the new attention object position information.

In moving the focus, the focus position control section may cause the focus during stages of movement to be displayed on the display surface.

In causing the focus during stages of movement to be displayed on the display surface, the focus position control section may gradually slow down the movement speed of the focus.

The focus position control section may gradually enlarge or reduce a size of the focus in accordance with a size of the object displayed at the position on the display surface indicated by the object position information specified by the attention information and a size of the object displayed at the position on the display surface indicated by the new attention object position information.

The information processing apparatus may further include a processing execution section. The reception section may further receive, from the information input apparatus which further accepts input of a processing request indicating that processing is to be executed, the processing request. When the processing request is received by the reception section, the processing execution section may execute processing corresponding to the new attention object position information.

The information processing apparatus may further include an attention information updating section which updates the attention information stored in the storage section by the information for specifying the new attention object position information.

The information processing apparatus may further include a cursor position information updating section which updates the cursor position information stored in the storage section by the new cursor position information determined by the cursor position determination section.

According to the embodiment of the present invention described above, it becomes possible for the user to easily input information for selecting a desired object from among the objects displayed on the display surface.

DETAILED DESCRIPTION OF THE EMBODIMENTS

Figure 1:
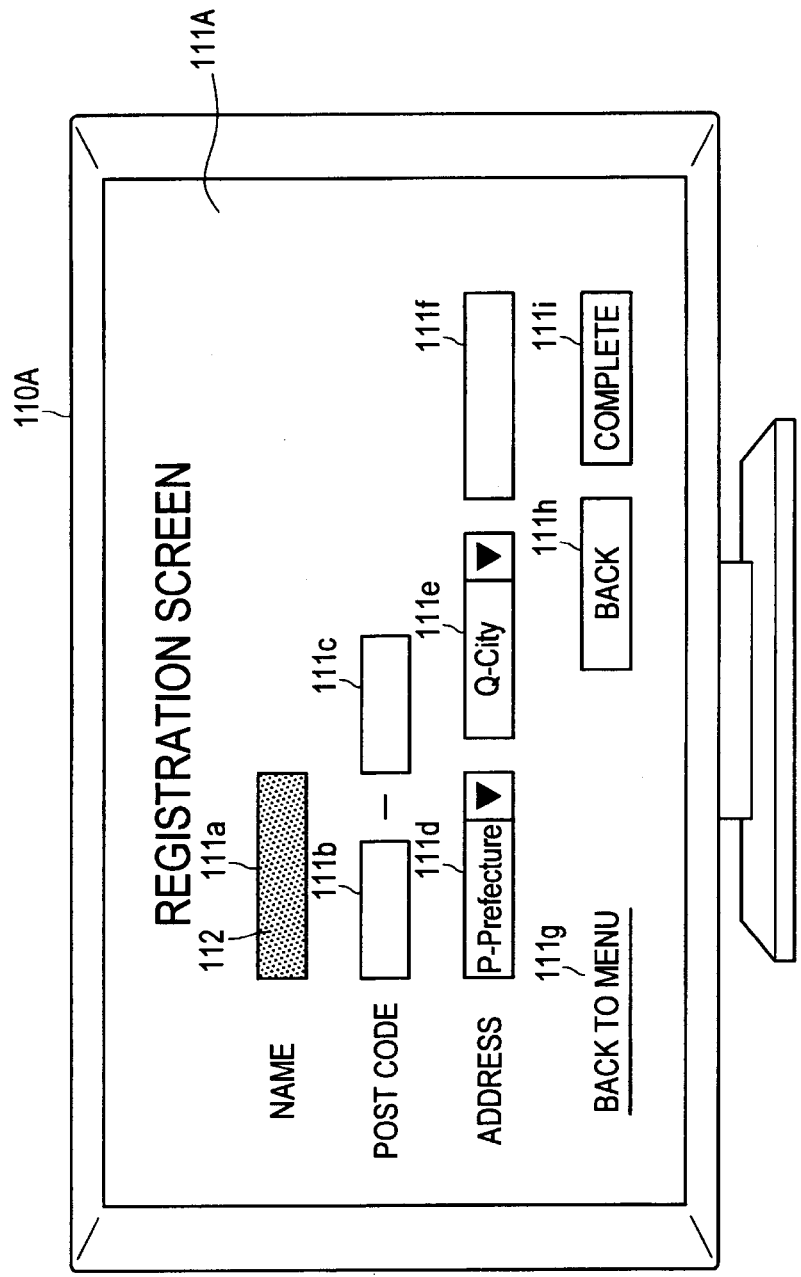
FIG. 1 is a diagram showing an example of a screen which is displayed on a display surface provided to an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. First embodiment
 1-1. Example of screen displayed on display surface provided to information processing apparatus
 1-2. Outline of functions of information processing apparatus
 1-3. Configuration of information processing system
 1-4. Functional configuration of information processing apparatus
 1-5. Examples of various pieces of information stored in storage section of information processing apparatus 1-6. Stages of movement of focus displayed on display surface of information processing apparatus
1-7. Functional configuration of information input apparatus
1-8. Hardware configuration of information processing apparatus
1-9. Hardware configuration of information input apparatus
1-10. Flow of operation of information processing apparatus
1-11. Modified example
2. Second embodiment
2-1. Example of screen (before cursor movement) displayed on display surface provided to information processing apparatus
2-2. Example of screen (after cursor movement) displayed on display surface provided to information processing apparatus
2-3. Outline of functions of information processing apparatus
2-4. Configuration of information processing system
2-5. Functional configuration of information processing apparatus
2-6. Examples of various pieces of information stored in storage section of information processing apparatus
2-7. Stages of movement of focus displayed on display surface of information processing apparatus
2-8. Functional configuration of information input apparatus
2-9. Hardware configuration of information processing apparatus
2-10. Hardware configuration of information input apparatus
2-11. Flow of operation of information processing apparatus
2-12. Modified example
3. Summary

1. First Embodiment

1-1. Example of Screen Displayed on Display Surface Provided to Information Processing Apparatus FIG. 1 is a diagram showing an example of a screen which is displayed on a display surface provided to an information processing apparatus according to a first embodiment of the present invention. With reference to FIG. 1 (refer to other figures as appropriate), description will be made on the screen which is displayed on the display surface provided to the information processing apparatus according to the first embodiment of the present invention.

As shown in FIG. 1, a display surface 111A provided to the information processing apparatus according to the first embodiment of the present invention is, for example, provided on a display section 110A included in the information processing apparatus. On respective positions of the display surface 111A, objects 111a to 111i are displayed. In FIG. 1, there is shown a case where nine objects are arranged on the display surface 111A, and the number of the objects arranged on the display surface 111A is not particularly limited. Further, the positions of the display surface 111A on which the respective objects are arranged are also not particularly limited. Further, in FIG. 1, there is shown a case where a registration screen for registering data such as personal information is displayed on the display surface 111A, and the kind of screen displayed on the display surface 111A is not particularly limited as long as it is a screen on which objects are arranged.

In FIG. 1, there are shown as examples of the objects: objects 111a to 111c and 111f each including a text box for entering a character string; objects 111d and 111e each including a pull-down menu for selecting a character string; an object 111g used for the transfer to a destination page; and objects 111h and 111i for executing predetermined processing. However, the objects displayed on the display surface 111A are not particularly limited as long as they can be visually understood by the user.

As shown in FIG. 1, a focus 112 for drawing a user's attention is displayed at the position of the object 111a. In FIG. 1, the focus 112 is shown as the one which fills the entire object 111a with a different color from that of objects 111b to 111i. However, the focus 112 may be displayed in any form as long as it emphasizes the object 111a in order to draw the user's attention. For example, the focus 112 may be displayed in such a manner that it surrounds the frame of the object 111a.

The focus 112 can be moved to any positions of the objects 111a to 111i by operation of the user. The information processing apparatus according to the present embodiment enables the user to easily input information for selecting a desired object from the objects 111a to 111i.

1-2. Outline of Functions of Information Processing Apparatus

Figure 2:
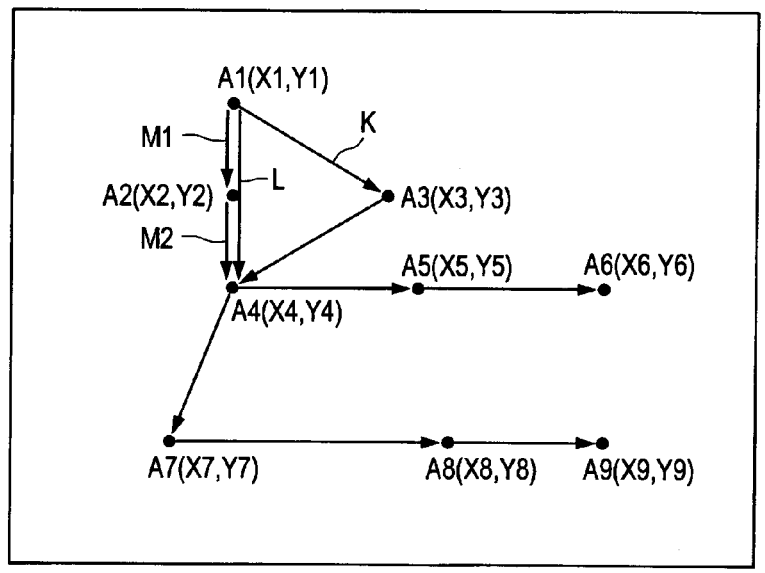
FIG. 2 is a diagram for illustrating an outline of functions of the information processing apparatus according to the embodiment.

FIG. 2 is a diagram for illustrating an outline of functions of the information processing apparatus according to the first embodiment of the present invention. With reference to FIG. 2 (refer to other figures as appropriate), description will be made on the outline of functions of the information processing apparatus according to the first embodiment of the present invention.

The information processing apparatus has a function of receiving, from an information input apparatus which accepted input of direction information indicating a direction on the display surface 111A, the direction information. The information input apparatus is not particularly limited as long as it has a function of accepting input of direction information indicating a direction on the display surface 111A from a user, and there can be used as the information input apparatus, for example, a remote control with a touch panel, a mouse, and a joystick.

In the case where a remote control with a touch panel is used as the information input apparatus, information that can be input to the information input apparatus is, for example, direction information indicating a direction in which the user moves an operating tool such as a finger or a pen by an operation of moving the operating tool while keeping the operating tool in contact with the touch panel (drag operation). In the same manner, in the case where a mouse is used as the information input apparatus, information that can be input to the information input apparatus is, for example, direction information indicating a direction in which the user moves the mouse by an operation of moving the mouse while keeping the clicked state (drag operation). In the case where a joystick is used as the information input apparatus, information that can be input to the information input apparatus is, for example, direction information indicating a direction in which the user tilts the joystick.

As shown in FIG. 2, positions of the objects 111a to 111i are represented by A1(X1, Y1) to A9(X9, Y9), respectively. In the example shown in FIG. 2, the centers of the objects 111a to 111*i* are represented by A1(X1, Y1) to A9(X9, Y9), respectively. However, the position of each of the objects 111*a* to 111*i* is not limited to the center of each of the objects 111*a* to 111*i*, and may be top-left of each of the objects 111*a* to 111*i*, for example.

When the user inputs the direction information indicating a direction to the information input apparatus, the information input apparatus accepts the input of the direction information, and the information processing apparatus receives the direction information from the information input apparatus. The information processing apparatus moves the focus 112 to the position indicated by object position information that is to be newly attended to, which is selected from pieces of object position information A1(X1, Y1) to A9(X9, Y9) based on the direction indicated by the received direction information.

For example, there is assumed a case where, when the focus 112 exists at A1(X1, Y1), the user inputs direction information indicating a direction of A3(X3, Y3) from A1(X1, Y1) to the information input apparatus. In this case, the information processing apparatus moves the focus 112 to A3(X3, Y3). A locus from the initial position to the destination position of the focus 112 is represented as a displacement K. The direction of A3(X3, Y3) from A1(X1, Y1) refers to a direction equal to that represented by a vector (X3-X1, Y3-Y1).

Further for example, there is assumed a case where, when the focus 112 exists at A1(X1, Y1), the user inputs direction information indicating a direction of A2(X2, Y2) from A1(X1, Y1) to the information input apparatus. In this case, the information processing apparatus moves the focus 112 to A2(X2, Y2). A locus from the initial position to the destination position of the focus 112 is represented as a displacement M1. The direction of A2(X2, Y2) from A1(X1, Y1) refers to a direction equal to that represented by a vector (X2-X1, Y2-Y1).

In addition, for example, there is also assumed a case where, after the information processing apparatus caused the focus 112 to move to A2(X2, Y2), the information input apparatus further accepts from the user the input of a focus continuous movement instruction which instructs to continuously move the focus 112. In this case, after receiving the direction information from the information input apparatus, the information processing apparatus further receives the focus continuous movement instruction. In the case where the information processing apparatus further receives the focus continuous movement instruction after receiving the direction information from the information input apparatus, the information processing apparatus may further cause the focus 112 to move to A4(X4, Y4). A locus from the initial position to the destination position of the focus 112 is represented as a displacement M2. The focus continuous movement instruction is input to the information input apparatus in various ways.

In the case where a remote control with a touch panel is used as the information input apparatus, the focus continuous movement instruction is input to the information input apparatus by, for example, an operation in which the user continuously keeps an operating tool in contact with the touch panel for a predetermined time period or longer without releasing the operating tool from the touch panel after the drag operation (long pressing operation). In the case where a mouse is used as the information input apparatus, the focus continuous movement instruction is input to the information input apparatus by, for example, an operation in which the user continuously presses a button of the mouse for a predetermined time period or longer after the drag operation of the mouse (long pressing operation). In the case where a joystick is used as the information input apparatus, the focus continuous movement instruction is input to the information input apparatus by, for example, an operation in which the user continuously keeps the joystick tilted for a predetermined time period or longer after the operation of tilting the joystick (long pressing operation).

Further, there is also assumed a case where, in addition to accepting the input of the direction information indicating a direction, the information input apparatus further accepts the input of speed along the direction. In this case, the information processing apparatus may determine the destination position of the focus 112 in accordance with the speed the input of which is accepted by the information input apparatus. For example, there is assumed a case where, when the focus 112 exists at A1(X1, Y1), the user inputs to the information input apparatus, in addition to the direction information indicating the direction of A2(X2, Y2) from A1(X1, Y1), a value larger than a threshold vale as the speed along that direction. In this case, the information processing apparatus moves the focus 112 to A4(X4, Y4). A locus from the initial position to the destination position of the focus 112 is represented as a displacement L. The speed is input to the information input apparatus in various ways.

In the case where a remote control with a touch panel is used as the information input apparatus, the speed is input to the information input apparatus as, for example, a speed in which the user moves an operating tool while keeping the operating tool in contact with the touch panel during the drag operation. In the case where a mouse is used as the information input apparatus, the speed is input to the information input apparatus as, for example, a speed in which the user moves the mouse while keeping a button of the mouse pressed during the drag operation. In the case where a joystick is used as the information input apparatus, the speed is input to the information input apparatus as, for example, a speed in which the user tilts the joystick.

1-3. Configuration of Information Processing System

Figure 3:
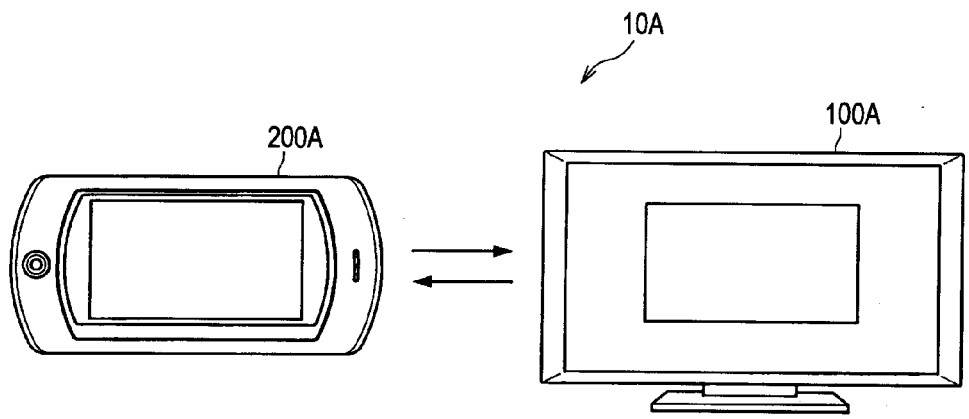
FIG. 3 is a diagram showing a configuration of an information processing system according to the embodiment.

FIG. 3 is a diagram showing a configuration of an information processing system according to the first embodiment of the present invention. With reference to FIG. 3 (refer to other figures as appropriate), description will be made on the configuration of the information processing system according to the first embodiment of the present invention.

As shown in FIG. 3, an information processing system 10A according to the first embodiment of the present invention includes an information processing apparatus 100A and an information input apparatus 200A. As described above, the information processing apparatus 100A has at least the display surface 111A, and includes a display section which can display information on the display surface 111A. Therefore, the information processing apparatus 100A is not particularly limited as long as it has the display section, and there can be used, for example, PC (Personal Computer) and a TV set as the information processing apparatus 100A.

As described above, the information input apparatus 200A has at least functions of accepting input of direction information indicating a direction on the display surface 111A and transmitting the accepted direction information to the information processing apparatus 100A via wire or radio. Therefore, the information input apparatus 200A is not particularly limited as long as it has those functions, and as described above, there can be used as the information input apparatus 200A, a remote control with a touch panel, a mouse, a joystick, and the like.

1-4. Functional Configuration of Information Processing Apparatus

Figure 4:
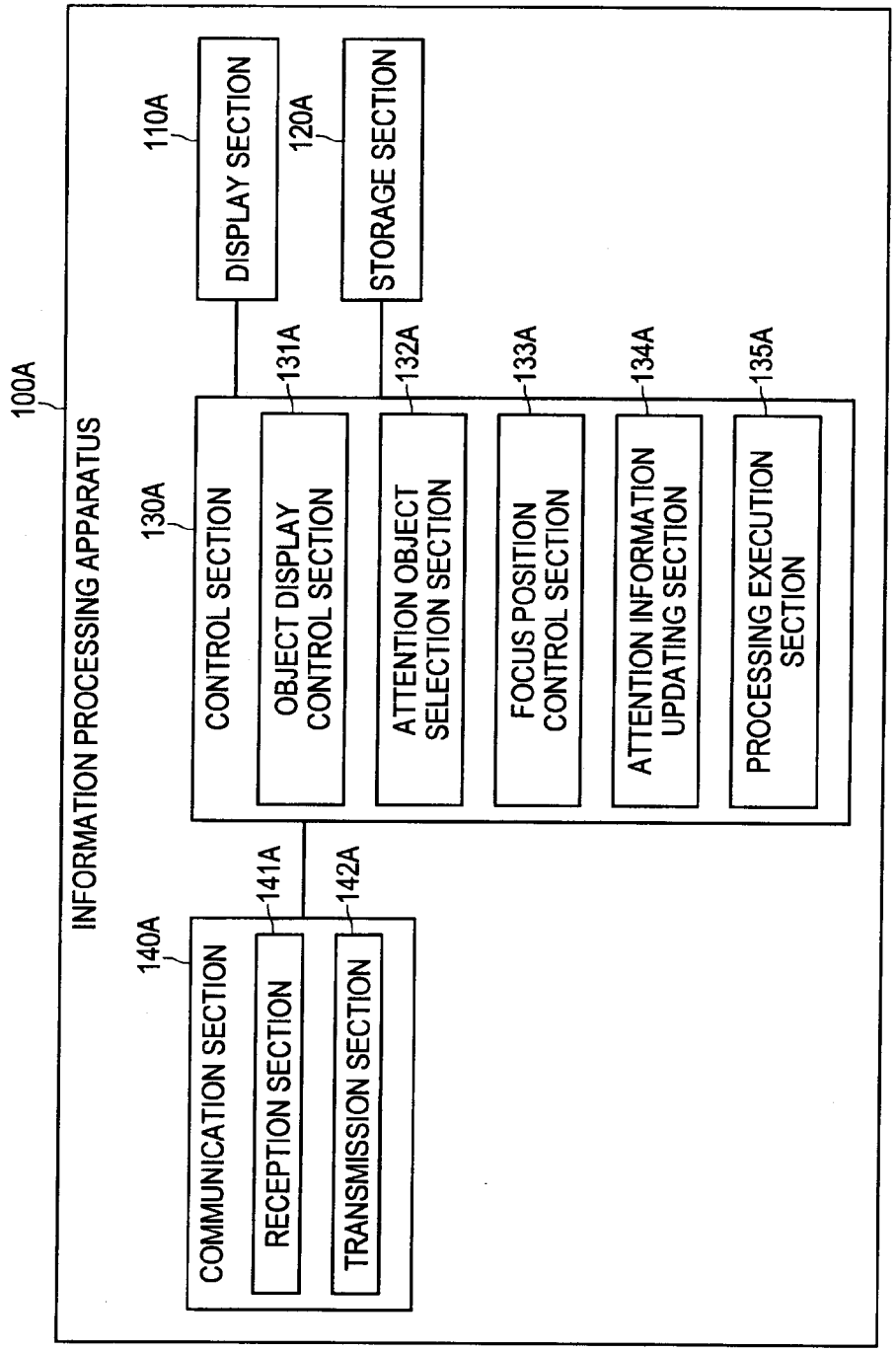
FIG. 4 is a diagram showing a functional configuration of the information processing apparatus according to the embodiment.

FIG. 4 is a diagram showing a functional configuration of the information processing apparatus according to the first embodiment of the present invention. With reference to FIG. 4 (refer to other figures as appropriate), description will be made on the functional configuration of the information processing apparatus according to the first embodiment of the present invention.

As shown in FIG. 4, the information processing apparatus 100A includes a display section 110A, a storage section 120A, a control section 130A, and a communication section 140A.

The display section 110A includes a display device, for example. The display section 110A has the display surface 111A and is capable of causing information to be displayed on the display surface 111A. The information to be displayed on the display surface 111A is output from the control section 130A, for example. Further, the display section 110A may exist outside the information processing apparatus 100A.

The storage section 120A includes a RAM (Random Access Memory), for example, and has a function of storing a program or data used when the control section 130A executes the program. As the data used when the control section 130A executes the program, there can be exemplified pieces of object position information (X1, Y1) to (X9, Y9) indicating positions of the objects 111a to 111i on the display surface 111A, respectively, and attention information for specifying at least one of the pieces of object position information (X1, Y1) to (X9, Y9). The respective pieces of object position information (X1, Y1) to (X9, Y9) and the attention information will be described later with additional reference to FIG. 5.

The communication section 140A has, for example, a reception section 141A and a transmission section 142A, and includes a communication device, for example. The reception section 141A has a function of receiving direction information indicating a direction on the display surface 111A from the information input apparatus 200A. The transmission section 142A has a function of transmitting various pieces of information to the information input apparatus 200A.

The control section 130A includes a CPU (Central Processing Unit), for example, and has an object display control section 131A, an attention object selection section 132A, a focus position control section 133A, and the like. The function of the control section 130A is realized by, for example, the CPU developing a program stored by a non-volatile memory in the RAM and executing the program developed in the RAM. The control section 130A determines whether information for identifying any of direction information, focus continuous movement instruction, and processing request is included in transmission information received by the reception section 141A. In the case where the control section 130A determines that the transmission information includes information for identifying any of the above, the control section 130A acquires the identification information from the transmission information, and performs control in accordance with the information identified by the acquired identification information.

The object display control section 131A has a function of causing the objects 111a to 111i to be displayed at the positions on the display surface 111A indicated by the pieces of object position information (X1, Y1) to (X9, Y9), respectively.

The attention object selection section 132A has a function of selecting new attention object position information indicating a position of an object that is to be newly attended to from the pieces of object position information (X1, Y1) to (X9, Y9), based on the direction information received from the information input apparatus 200A by the reception section 141A.

The focus position control section 133A has a function of causing the focus 112 to be displayed at a position on the display surface 111A indicated by the object position information specified by the attention information. Further, the focus position control section 133A has a function of causing the focus 112 to move to a position on the display surface 111A indicated by the new attention object position information selected by the attention object selection section 132A.

The attention object selection section 132A may select new attention object position information based on the direction information received by the reception section 141A and the pieces of object position information (X1, Y1) to (X9, Y9) stored in the storage section 120A.

The attention object selection section 132A may select as the new attention object position information, from among the pieces of object position information (X1, Y1) to (X9, Y9) stored in the storage section 120A, information indicating a position proceeded in the direction indicated by the direction information received by the reception section 141A from the position indicated by the object position information specified by the attention information. For example, in the case where object position information (X1, Y1) is specified by the attention information, the position indicated by the object position information (X1, Y1) is used as a reference. Then, in the case where the direction information received by the reception section 141A is (X3-X1, Y3-Y1), object position information (X3, Y3) indicating the position proceeded in the direction indicated by (X3-X1, Y3-Y1) from the position indicated by the object position information (X1, Y1) is selected as the new attention object position information.

In the case where there are multiple pieces of attention candidate position information each indicating the position proceeded in the direction indicated by the direction information received by the reception section 141A from the position indicated by the object position information specified by the attention information, the attention object selection section 132A may select, as the new attention object position information, from among the multiple pieces of attention candidate position information, information indicating the closest position from the position indicated by the object position information specified by the attention information. For example, there are two pieces of information, (X2, Y2) and (X4, Y4), as the pieces of attention candidate position information each indicating the position proceeded in the direction indicated by (X2-X1, Y2-Y1) from the position indicated by the object position information (X1, Y1) specified by the attention information. From among the two pieces of information, the attention object selection section 132A selects, as the new attention object position information, (X2, Y2) which indicates the closest position from the position indicated by the object position information (X1, Y1) specified by the attention information.

The reception section 141A is capable of further receiving speed along a direction from the information input apparatus 200A. In this case, when there are multiple pieces of attention candidate position information, the attention object selection section 132A may select, as the new attention object position information, from among the multiple pieces of attention candidate position information, information indicating the closest position to a position which is away by a distance proportional to the speed from the position indicated by the object position information correlated with the attention information. For example, as described above, there is assumed a case where two pieces of information, (X2, Y2) and (X4, Y4), exist as the pieces of attention candidate position information. From among the two pieces of information, the attention object selection section 132A selects, as the new attention object position information, information indicating the closest position to a position which is away by a distance proportional to the speed from the position indicated by the object position information (X1, Y1) correlated with the attention information. For example, in the case where the speed is relatively low, the attention object selection section 132A selects (X2, Y2) as the new attention object position information, and in the case where the speed is relatively high, the attention object selection section 132A selects (X4, Y4) as the new attention object position information. Note that as the speed, there can be assumed various speeds, and examples thereof are as described above.

The control section 130A may further include an attention information updating section 134A. In this case, the attention information updating section 134A updates the attention information stored in the storage section 120A by the information for specifying the new attention object position information. In this way, the control section 130A can perform similar processing again by using the updated attention information.

In addition, there is also assumed a case where, after receiving the direction information, the reception section 141A further receives a focus continuous movement instruction which instructs to continuously move the focus 112 from the information input apparatus 200A. In this case, each time the focus continuous movement instruction is received by the reception section 141A, the attention object selection section 132A may select as the new attention object position information, from among the multiple pieces of attention candidate position information, information sequentially from information indicating the closest position to information indicating the farthest position, using as a reference the position indicated by the object position information specified by the attention information. For example, as described above, there is assumed a case where two pieces of information, (X2, Y2) and (X4, Y4), exist as the pieces of attention candidate position information. From among the two pieces of information, the attention object selection section 132A selects, as the new attention object position information, information sequentially from the information indicating the closest position (X2, Y2) to the information indicating the farthest position (X4, Y4), using as a reference the position indicated by the object position information (X1, Y1) correlated with the attention information. Note that as the focus continuous movement instruction, there can be assumed various instructions, and examples thereof are as described above.

In the case where the speed received by the reception section 141A is lower than a threshold value, the attention object selection section 132A may not select the new attention object position information. In this way, for example, when the speed input to the information input apparatus 200A by the user is lower than the threshold value, it can be assumed that it is the case where the user is not intended to move the focus 112, and hence, it is possible not to move the focus 112. As the threshold value, there can be used a value stored in the storage section 120A, for example.

The control section 130A may further include a processing execution section 135A. There is assumed a case where the reception section 141A further receives a processing request indicating that processing is to be executed from the information input apparatus 200A. In this case, when the processing request is received by the reception section 141A, the processing execution section 135A executes processing corresponding to the new attention object position information. As the processing corresponding to the new attention object position information, in the case where, for example, (X1, Y1) is selected as the new attention object position information, there can be assumed processing for inputting a character string in a text box which is the object 111a displayed at the position indicated by (X1, Y1). Further, for example, in the case where (X9, Y9) is selected as the new attention object position information, data registration is performed as processing corresponding to the object 111i displayed at the position indicated by (X9, Y9).

In the case where a remote control with a touch panel is used as the information input apparatus, the processing request can be input to the information input apparatus by, for example, an operation of touching the touch panel with an operating tool such as a finger or a pen (tap operation). In the same manner, in the case where a mouse is used as the information input apparatus, the processing request can be input to the information input apparatus by, for example, an operation of the user clicking the mouse (click operation). In the case where a joystick is used as the information input apparatus, the processing request can be input to the information input apparatus by, for example, an operation of the user pressing a button provided to the joystick.

Figure 5:
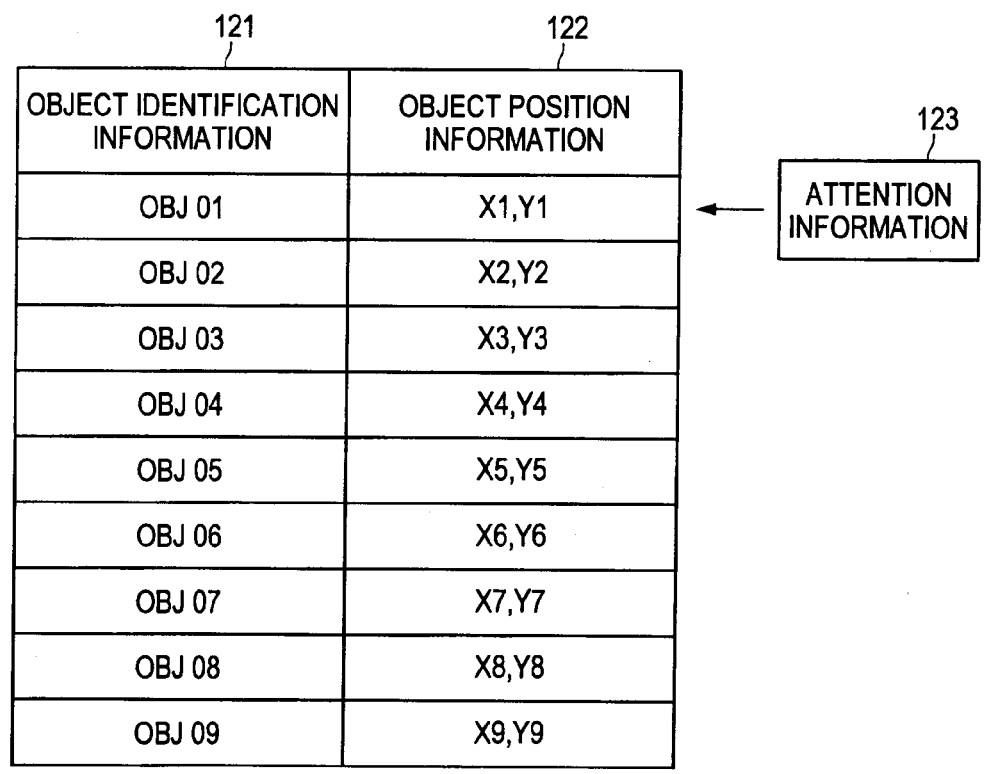
FIG. 5 is a diagram showing examples of various pieces of information stored in a storage section of the information processing apparatus according to the embodiment.

1-5. Examples of Various Pieces of Information Stored in Storage Section of Information Processing Apparatus FIG. 5 is a diagram showing examples of various pieces of information stored in a storage section of the information processing apparatus according to the first embodiment of the present invention. With reference to FIG. 5 (refer to other figures as appropriate), description will be made on various pieces of information stored in the storage section of the information processing apparatus according to the first embodiment of the present invention.

As shown in FIG. 5, the storage section 120A of the information processing apparatus 100A according to the first embodiment of the present invention stores object identification information 121 and object position information 122, the object identification information 121 and the object position information 122 being correlated with each other. In addition thereto, the storage section 120A stores attention information 123.

The object identification information 121 is for identifying pieces of object data used for displaying the objects 111a to 111i. For example, the object data used for displaying the object 111a includes image data or the like for displaying a text box, and the object data used for displaying the object 111g includes character code or the like. The object data is stored in the storage section 120A, for example.

The object position information 122 is position information for indicating a position at which each of the objects 111a to 111i is displayed on the display surface 111A. The object position information 122 may be a fixed value or may be a changeable value. For example, in the case where the objects 111a to 111i are pasted within a window displayed on the display surface 111A and the control section 130A causes the window to move in accordance with the operation of the user, the object position information 122 may be changed in accordance with the movement distance of the window.

The attention information 123 is information for specifying at least one of the pieces of object position information (X1, Y1) to (X9, Y9). In FIG. 5, there is shown a case where the information for specifying (X1, Y1) is set as the attention information 123. As the attention information 123, there can be used an address indicating a location in the storage section 120A at which the object position information 122 is stored.

Figure 6:
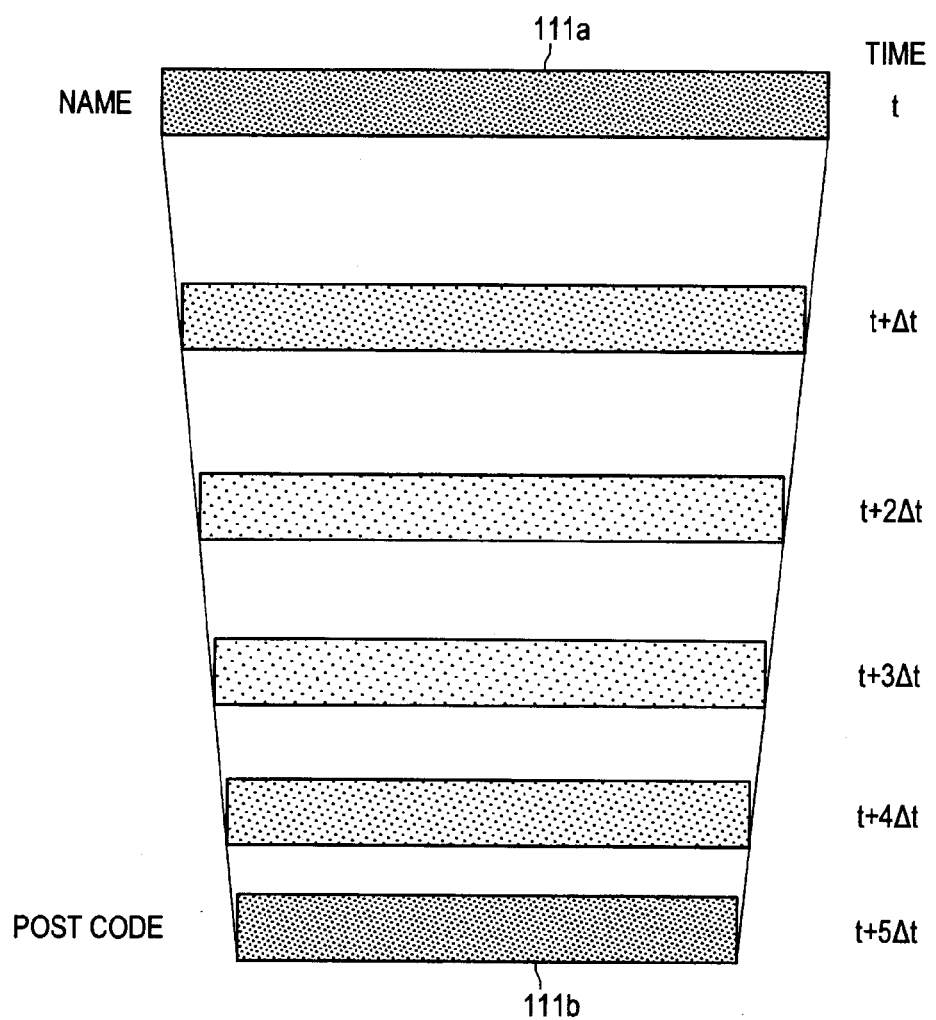
FIG. 6 is a diagram for illustrating stages of movement of a focus displayed on the display surface of the information processing apparatus according to the embodiment.

1-6. Stages of Movement of Focus Displayed on Display Surface of Information Processing Apparatus FIG. 6 is a diagram for illustrating stages of movement of a focus displayed on the display surface of the information processing apparatus according to the first embodiment of the present embodiment. With reference to FIG. 6 (refer to other figures as appropriate), description will be made on the stages of movement of a focus displayed on the display surface of the information processing apparatus according to the first embodiment of the present embodiment.

As shown in FIG. 6, in moving the focus 112, the focus position control section 133A may cause the focus 112 during the stages of movement to be displayed on the display surface 111A. In this way, the user can visually understand the stages of the focus 112 moving from the initial position to the destination position. In FIG. 6, there are shown the stages of the focus 112 moving from the object 111a to the object 111b.

In causing the focus 112 during the stages of movement to be displayed on the display surface 111A, the focus position control section 133A may gradually slow down the movement speed of the focus 112. In FIG. 6, there are shown the positions of the focus 112 displayed on the display surface 111A at the times t, t+Δt, t+2Δt, t+3Δt, t+4Δt, and t+5Δt. In this way, the user can more naturally understand the destination position of the focus 112.

The focus position control section 133A may gradually enlarge or reduce the size of the focus 112 in accordance with the size of the object displayed at the position on the display surface 111A indicated by the object position information specified by the attention information and the size of the object displayed at the position on the display surface 111A indicated by the new attention object position information.

In FIG. 6, there is shown a case where the object displayed at the position on the display surface 111A indicated by the object position information (X1, Y1) specified by the attention information is the object 111a, and the object displayed at the position on the display surface 111A indicated by the new attention object position information (X2, Y2) is the object 111b. In this case, because the object 111a is larger than the object 111b, the focus position control section 133A may gradually reduce the size of the focus 112, for example, as shown in FIG. 6.

Further, for example, there is considered a case where the object displayed at the position on the display surface 111A indicated by the object position information (X2, Y2) specified by the attention information is the object 111b, and the object displayed at the position on the display surface 111A indicated by the new attention object position information (X4, Y4) is the object 111d. In this case, because the object 111b is smaller than the object 111d, the focus position control section 133A may gradually enlarge the size of the focus 112, for example.

In displaying the focus 112 during the stages of movement on the display surface 111A, the focus position control section 133A may gradually decrease and then increase the transmittance of the focus 112. In FIG. 6, there are shown the stages in which the transmittance of the focus 112 is decreased as the time elapses in the order of t, t+Δt, and t+2Δt, and the transmittance of the focus 112 is increased as the time elapses in the order of t+3Δt, t+4Δt, and t+5Δt. In this way, the user can more naturally understand the stages of movement of the focus 112. When the transmittance is represented by $\alpha$, the pixel value of the position at which the focus 112 is displayed, for example, can be calculated by, for example, (pixel value of background)×(1−$\alpha$)+(pixel value of focus 112)×$\alpha$.

1-7. Functional Configuration of Information Input Apparatus

Figure 7:
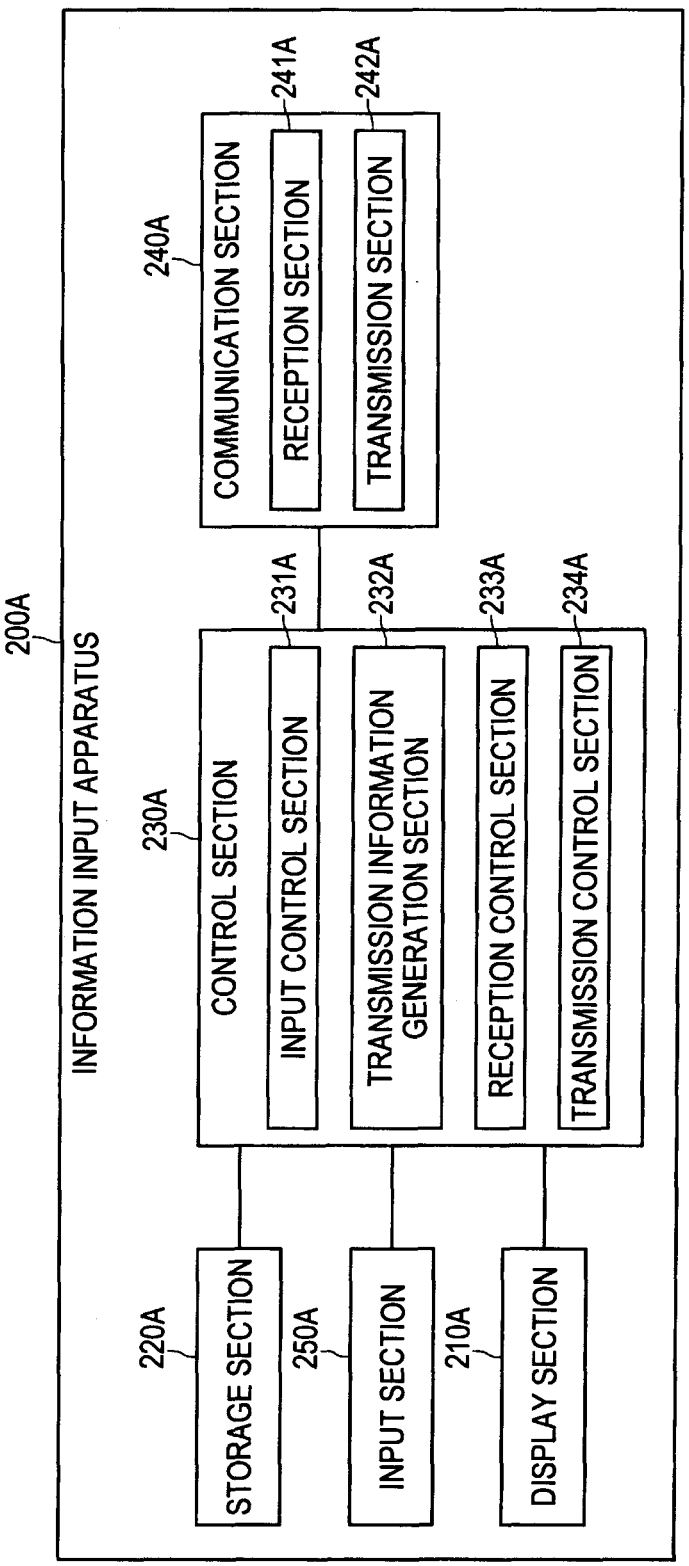
FIG. 7 is a diagram showing a functional configuration of an information input apparatus according to the embodiment.

FIG. 7 is a diagram showing a functional configuration of an information input apparatus according to the first embodiment of the present invention. With reference to FIG. 7 (refer to other figures as appropriate), description will be made on the functional configuration of the information input apparatus according to the first embodiment of the present invention.

As shown in FIG. 7, the information input apparatus 200A includes at least a communication section 240A and an input section 250A. Further, the information input apparatus 200A includes as necessary, a display section 210A, a storage section 220A, a control section 230A, and the like.

The input section 250A has a function of accepting input of direction information indicating a direction on the display surface 111A. In addition, the input section 250A may also have a function of further accepting input of speed along the direction. Still further, the input section 250A may also have a function of further accepting input of focus continuous movement instruction. Still further, the input section 250A may also have a function of further accepting input of a processing request. As described above, the input section 250A includes, for example, a touch panel, a mouse, and a joystick, and may be any input device as long as it has a function of accepting the input of direction information indicating a direction on the display surface 111A.

The communication section 240A has a reception section 241A, a transmission section 242A, and the like, and includes, for example, a communication device. The reception section 241A has a function of receiving various pieces of information from the information processing apparatus 100A. The transmission section 242A has a function of transmitting various pieces of information to the information processing apparatus 100A, and has, for example, a function of transmitting the direction information the input of which is accepted by the input section 250A. Further, the communication section 240A may further have a function of transmitting the speed, the focus continuous movement instruction, the processing request, and the like, the input of which is accepted by the input section 250A to the information processing apparatus 100A.

The display section 210A includes a display device, for example. The display section 210A has a display surface (not shown) and is also capable of displaying information on the display surface (not shown). In the case where a touch panel is used as the input section 250A, correspondence information may be stored in the storage section 220A, the correspondence information being formed of position information indicating a position on the touch panel and position information indicating a position on the display surface (not shown) which are correlated with each other. In this case, an input control section 231A can figure out, by referring to the correspondence information, the correlation between the position information indicating a position on the touch panel and the position information indicating a position on the display surface (not shown). The information to be displayed on the display surface (not shown) is output from the control section 230A, for example. Further, the display section 210A may exist outside the information input apparatus 200A.

The storage section 220A includes a RAM, for example, and has a function of storing a program or data used when the control section 230A executes the program.

The control section 230A includes a CPU, for example, and has the input control section 231A, a transmission information generation section 232A, a reception control section 233A, a transmission control section 234A, and the like. The function of the control section 230A is realized by, for example, the CPU developing a program stored by a non-volatile memory in the RAM and executing the program developed in the RAM.

The input control section 231A has a function of acquiring various pieces of information from the input section 250A, the input of which is accepted by the input section 250A. The various pieces of information acquired by the input control section 231A are output to the transmission information generation section 232A, for example.

The transmission information generation section 232A has a function of generating transmission information to be transmitted to the information processing apparatus 100A by determining the various pieces of information acquired by the input control section 231A. In the case where, for example, the transmission information generation section 232A determines that direction information is included in the information acquired by the input control section 231A, the transmission information generation section 232A generates transmission information including information for identifying the direction information and the direction information. In the case where, for example, the transmission information generation section 232A determines that speed is included in the information acquired by the input control section 231A, the transmission information generation section 232A may further include the speed into the transmission information.

In the case where, for example, the transmission information generation section 232A determines that focus continuous movement instruction is included in the information acquired by the input control section 231A, the transmission information generation section 232A generates transmission information including information for identifying the focus continuous movement instruction. In the case where, for example, the transmission information generation section 232A determines that a processing request is included in the information acquired by the input control section 231A, the transmission information generation section 232A generates transmission information including information for identifying the processing request.

The reception control section 233A has a function of acquiring the various pieces of information received by the reception section 241A. The various pieces of information acquired by the reception control section 233A is determined by the control section 230A, and the control in accordance with the determination results is performed by the control section 230A.

The transmission control section 234A has a function of transmitting the transmission information generated by the transmission information generation section 232A to the information processing apparatus 100A via wire or radio.

1-8. Hardware Configuration of Information Processing Apparatus

Figure 8:
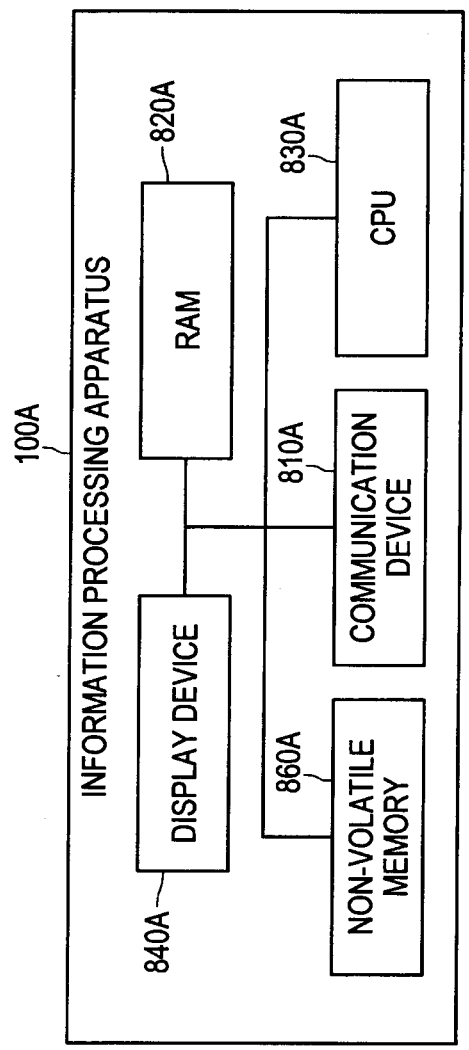
FIG. 8 is a diagram showing a hardware configuration of the information processing apparatus according to the embodiment.

FIG. 8 is a diagram showing a hardware configuration of the information processing apparatus according to the first embodiment of the present invention. With reference to FIG. 8 (refer to other figures as appropriate), description will be made on the hardware configuration of the information processing apparatus according to the first embodiment of the present invention.

As shown in FIG. 8, the information processing apparatus 100A mainly includes, for example, a display device 810A, a RAM 820A, a CPU 830A, a communication device 840A, and a non-volatile memory 860A, However, hardware provided to the information processing apparatus 100A is not limited thereto, and may be replaced with other hardware or may be added with other hardware, as appropriate.

The display device 810A includes a display surface, and is capable of causing information to be displayed on the display surface. The display device 810A includes a device such as an LCD (Liquid Crystal Display) or an organic EL (Electroluminescence) display device, which is capable of visually notifying the user of the information. For example, the display device 810A outputs the results obtained by various processing performed by the information processing apparatus 100A in a form of a text or an image.

The RAM 820A primarily stores a program executed by the CPU 830A, data used when the program is executed, and the like.

The CPU 830A functions as an arithmetic processing unit and a control unit and controls the overall operation inside the information processing apparatus 100A or a portion thereof according to various programs recorded in the RAM 820A and the non-volatile memory 860A.

The communication device 840A has a function of performing communication with the information input apparatus 200A. The communication device 840A is capable of, by instruction from the CPU 830A, receiving a signal from the information input apparatus 200A via wire or radio and transmitting a signal to the information input apparatus 200A via wire or radio.

The non-volatile memory 860A is a device for storing data, and includes, for example, a magnetic storage device such as an HDD (Hard Disk Drive), a semiconductor storage device, an optical storage device, and a magneto-optical storage device. The non-volatile memory 860A stores, for example, programs executed by the CPU 830A and various kinds of data.

In the foregoing, an example of the hardware configuration which can realize the function of the information processing apparatus 100A according to the first embodiment of the present invention has been shown. Each of the above components may be configured using general-purpose members or hardware specialized for the function of each component. Therefore, the hardware configuration to be used can be changed appropriately in accordance with the technical level each time when the present embodiment is carried out.

1-9. Hardware Configuration of Information Input Apparatus

Figure 9:
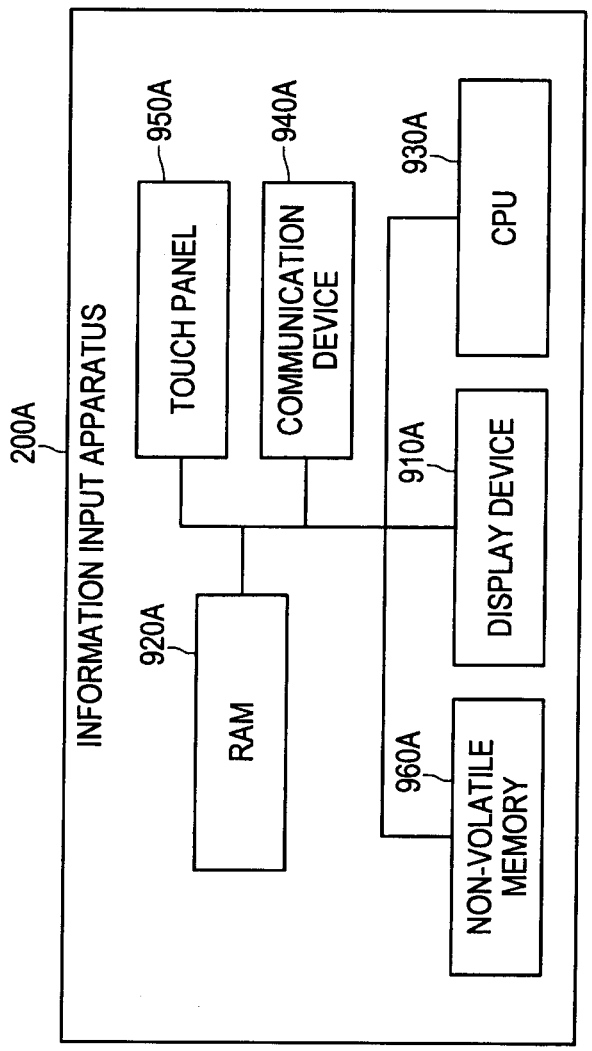
FIG. 9 is a diagram showing a hardware configuration of the information input apparatus according to the embodiment.

FIG. 9 is a diagram showing a hardware configuration of the information input apparatus according to the first embodiment of the present invention. With reference to FIG. 9 (refer to other figures as appropriate), description will be made on the hardware configuration of the information input apparatus according to the first embodiment of the present invention.

As shown in FIG. 9, the information input apparatus 200A mainly includes, for example, a display device 910A, a RAM 920A, a CPU 930A, a communication device 940A, a touch panel 950A, and a non-volatile memory 960A. However, hardware provided to the information input apparatus 200A is not limited thereto, and may be replaced with other hardware or may be added with other hardware, as appropriate. For example, the information input apparatus 200A may include the display device 910A according to the needs of the user. Further, another device which is capable of accepting the input of position information from the user can be used instead of the touch panel 950A, and, for example, a mouse or a joystick can be used therefor.

The display device 910A includes a display surface, and is capable of causing information to be displayed on the display surface. The display device 910A includes a device such as an LCD or an organic EL display device, which is capable of visually notifying the user of the information. For example, the display device 910A outputs the results obtained by various processing performed by the information input apparatus 200A in a form of a text or an image.

The RAM 920A primarily stores a program executed by the CPU 930A, data used when the program is executed, and the like.

The CPU 930A functions as an arithmetic processing unit and a control unit and controls the overall operation inside the information input apparatus 200A or a portion thereof according to various programs recorded in the RAM 920A and the non-volatile memory 960A.

The communication device 940A has a function of performing communication with the information processing apparatus 100A. The communication device 940A is capable of, by instruction from the CPU 930A, receiving a signal from the information processing apparatus 100A via wire or radio and transmitting a signal to the information processing apparatus 100A via wire or radio.

The touch panel 950A has a contact surface, and outputs, to the CPU 930A as an information signal, position information indicating a position on the contact surface at which an operating tool (such as a user's finger or a pen) touches. The user causes the operating tool to touch the touch panel 950A, to thereby input various kinds of data and instruct processing operation to the information input apparatus 200A. As the touch panel 950A, any can be used as long as it can detect the position on the contact surface at which the operating tool touches.

The non-volatile memory 960A is a device for storing data, and includes, for example, a magnetic storage device such as an HDD, a semiconductor storage device, an optical storage device, and a magneto-optical storage device. The non-volatile memory 960A stores, for example, programs executed by the CPU 930A and various kinds of data.

In the foregoing, an example of the hardware configuration which can realize the function of the information input apparatus 200A according to the first embodiment of the present invention has been shown. Each of the above components may be configured using general-purpose members or hardware specialized for the function of each component. Therefore, the hardware configuration to be used can be changed appropriately in accordance with the technical level each time when the present embodiment is carried out.

1-10. Flow of Operation of Information Processing Apparatus

Figure 10:
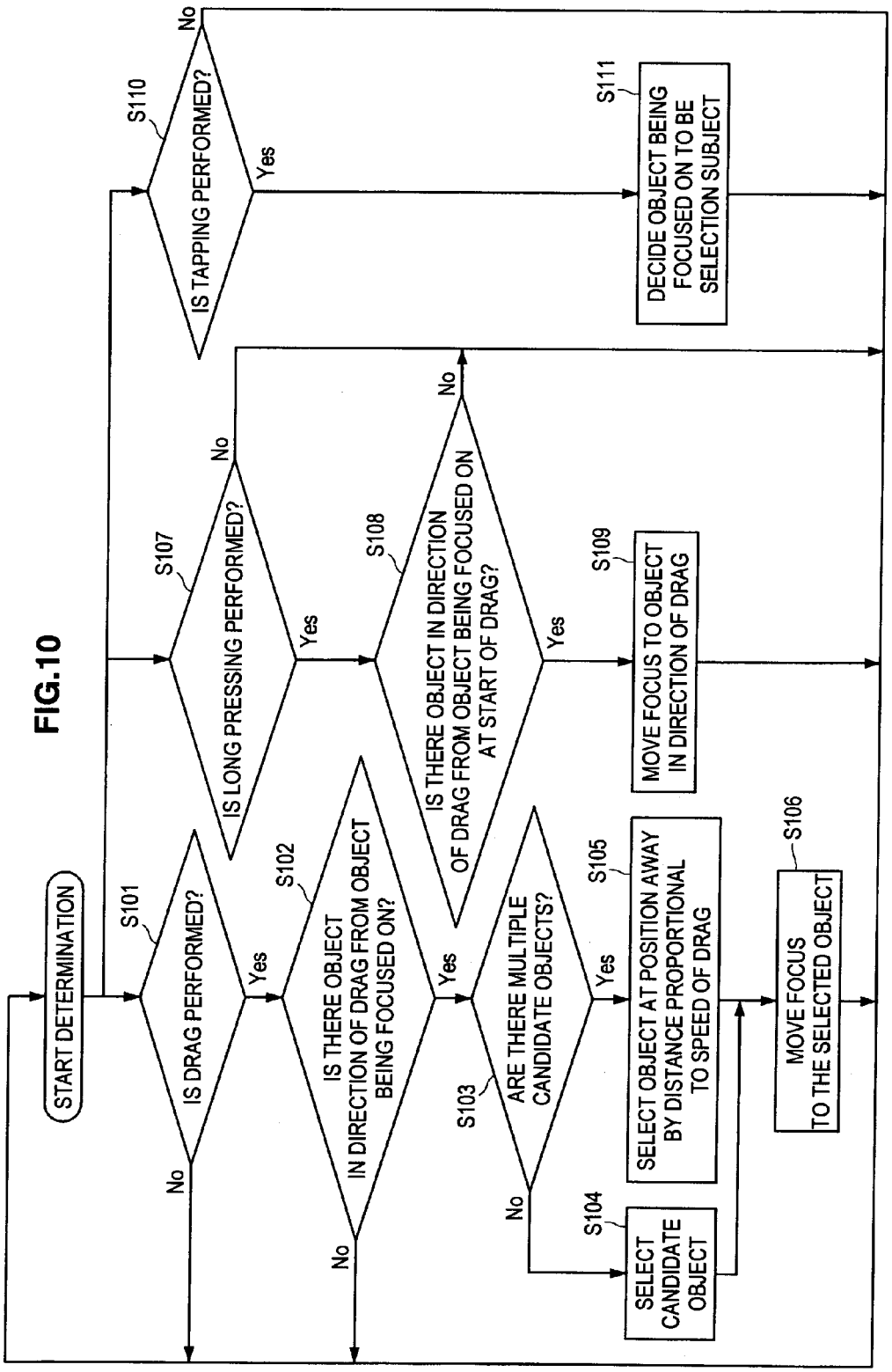
FIG. 10 is a flowchart showing a flow of operation of the information processing apparatus according to the embodiment.

FIG. 10 is a flowchart showing a flow of operation of the information processing apparatus according to the first embodiment of the present invention. With reference to FIG. 10 (refer to other figures as appropriate), description will be made on the flow of operation of the information processing apparatus according to the first embodiment of the present invention. Note that described herein are examples in which direction and speed, focus continuous movement instruction, and processing request are each input to the information input apparatus 200A by a drag operation, a long pressing operation, and a tap operation.

As shown in FIG. 10, the information processing apparatus 100A starts to determine the operation of the user, and determines whether the user performs a drag operation (Step S101). In the case where it is determined that the user does not perform the drag operation ("No" at Step S101), the information processing apparatus 100A further determines the operation of the user. In the case where it is determined that the user performs the drag operation ("Yes" at Step S101), the information processing apparatus 100A determines whether there is an object in the direction of the drag operation from the object being focused on with the focus 112 (Step S102).

In the case where it is determined that there is no object in the direction of the drag operation from the object being focused on with the focus 112 ("No" at Step S102), the information processing apparatus 100A further determines the operation of the user. In the case where it is determined that there is an object in the direction of the drag operation from the object being focused on with the focus 112 ("Yes" at Step S102), the information processing apparatus 100A determines whether there are multiple candidate objects (Step S103).

In the case where it is determined that there is one candidate object ("No" at Step S103), the information processing apparatus 100A selects the candidate object (Step S104) and proceeds to Step S106. In the case where it is determined that there are multiple candidate objects ("Yes" at Step S103), the information processing apparatus 100A selects an object at a position which is away by a distance proportional to the speed of the drag operation (Step S105) and proceeds to Step S106. The information processing apparatus 100A causes the focus 112 to be moved to the selected object (Step S106), and further determines the operation of the user.

Further, the information processing apparatus 100A starts to determine the operation of the user, and determines whether the user performs a long pressing operation (Step S107). In the case where it is determined that the user does not perform the long pressing operation ("No" at Step S107), the information processing apparatus 100A further determines the operation of the user. In the case where it is determined that the user performs the long pressing operation ("Yes" at Step S107), the information processing apparatus 100A determines whether there is an object, at the start of the drag operation, in the direction of the drag operation from the object being focused on with the focus 112 (Step S108).

In the case where it is determined that there is no object, at the start of the drag operation, in the direction of the drag operation from the object being focused on with the focus 112 ("No" at Step S108), the information processing apparatus 100A further determines the operation of the user. In the case where it is determined that there is an object, at the start of the drag operation, in the direction of the drag operation from the object being focused on with the focus 112 ("Yes" at Step S108), the information processing apparatus 100A causes the focus 112 to be moved to the object in the direction of the drag operation (Step S109), and further determines the operation of the user.

Further, the information processing apparatus 100A starts to determine the operation of the user, and determines whether the user performs a tap operation (Step S110). In the case where it is determined that the user does not perform the tap operation ("No" at Step S110), the information processing apparatus 100A further determines the operation of the user. In the case where it is determined that the user performs the tap operation ("Yes" at Step S110), the information processing apparatus 100A decides the object being focused on with the focus 112 to be the selection subject (Step S111), and further determines the operation of the user.

1-11. Modified Example

It should be understood by those skilled in the art that various modifications, combinations, sub-combinations and alterations may occur depending on design requirements and other factors insofar as they are within the scope of the appended claims or the equivalents thereof.

For example, in the present embodiment, the attention object selection section 132A selects as the new attention object position information (X3, Y3), from among the pieces of object position information (X1, Y1) to (X9, Y9) stored in the storage section 120A, information indicating a position proceeded in the direction information (X3-X1, Y3-Y1) received by the reception section 141A from the position indicated by the object position information (X1, Y1) specified by the attention information. However, it is also possible that the attention object selection section 132A selects, as new attention object position information, information not indicating the position proceeded in the direction information (X3-X1, Y3-Y1) received by the reception section 141A from the position indicated by the object position information (X1, Y1) specified by the attention information.

For example, the attention object selection section 132A may determine whether there exists object position information whose distance from the information indicating the position proceeded in the direction indicated by the direction information (X3-X1, Y3-Y1) received by the reception section 141A from the position indicated by the object position information (X1, Y1) specified by the attention information is less than a predetermined value. In the case where the attention object selection section 132A determines that there exists object position information whose distance is less than the predetermined value, it is also possible to select the object position information as new attention object position information. As the predetermined value, the one stored in the storage section 120A can be used, for example.

2. Second Embodiment

Figure 11:
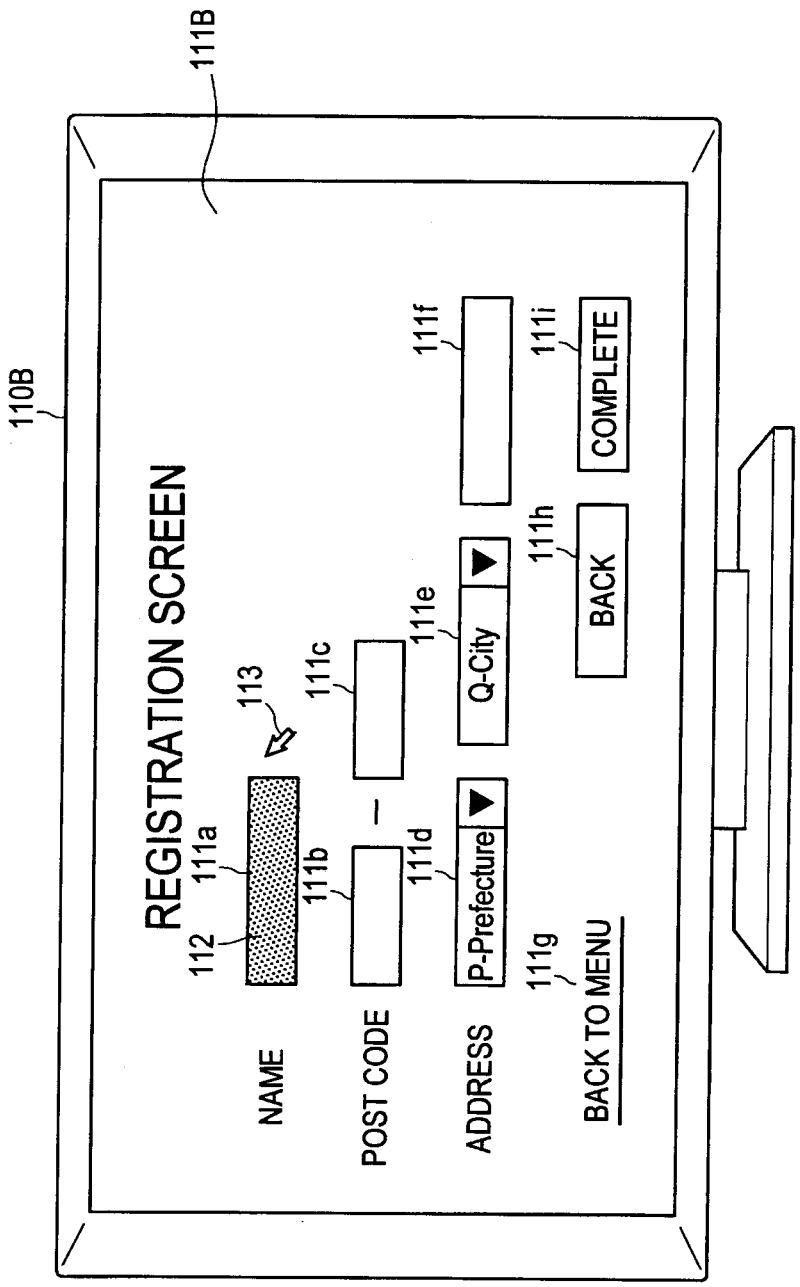
FIG. 11 is a diagram showing an example of a screen (before cursor movement) which is displayed on a display surface provided to an information processing apparatus according to a second embodiment of the present invention.

2-1. Example of Screen (Before Cursor Movement) Displayed on Display Surface Provided to Information Processing Apparatus FIG. 11 is a diagram showing an example of a screen (before cursor movement) which is displayed on a display surface provided to an information processing apparatus according to a second embodiment of the present invention. With reference to FIG. 11 (refer to other figures as appropriate), description will be made on the screen (before cursor movement) which is displayed on the display surface provided to the information processing apparatus according to the second embodiment of the present invention.

As shown in FIG. 11, a display surface 111B provided to the information processing apparatus according to the second embodiment of the present invention is, for example, provided on a display section 110B included in the information processing apparatus. On respective positions of the display surface 111B, objects 111a to 111i are displayed. In FIG. 11, there is shown a case where nine objects are arranged on the display surface 111B, and the number of the objects arranged on the display surface 111B is not particularly limited. Further, the positions of the display surface 111B on which the respective objects are arranged are also not particularly limited. Further, in FIG. 11, there is shown a case where a registration screen for registering data such as personal information is displayed on the display surface 111B, and the kind of screen displayed on the display surface 111B is not particularly limited as long as it is a screen on which objects are arranged.

In FIG. 11, there are shown as examples of the objects: objects 111a to 111c and 111f each including a text box for entering a character string; objects 111d and 111e each including a pull-down menu for selecting a character string; an object 111g used for the transfer to a destination page; and objects 111h and 111i for executing predetermined processing. However, the objects displayed on the display surface 111B are not particularly limited as long as they can be visually understood by the user.

As shown in FIG. 11, a focus 112 for drawing a user's attention is displayed at the position of the object 111a. In FIG. 11, the focus 112 is shown as the one which fills the entire object 111a with a different color from that of objects 111b to 111i. However, the focus 112 may be displayed in any form as long as it emphasizes the object 111a in order to draw the user's attention. For example, the focus 112 may be displayed in such a manner that it surrounds the frame of the object 111a.

The focus 112 can be moved to any positions of the objects 111a to 111i by operation of the user. A cursor 113 can be moved by the operation of the user on the display surface 111B. The information processing apparatus according to the present embodiment enables the user to easily input information for selecting a desired object from the objects 111a to 111i.

Figure 12:
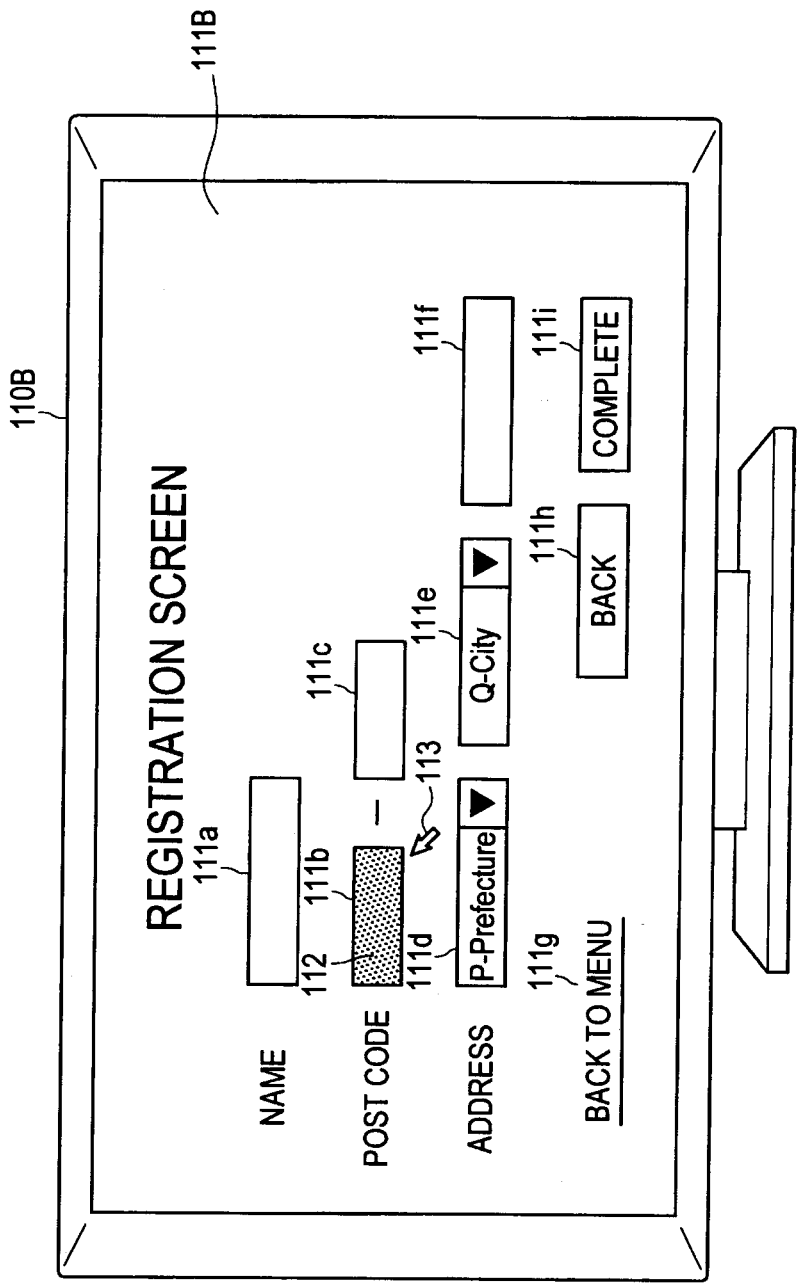
FIG. 12 is a diagram showing an example of the screen (after cursor movement) which is displayed on the display surface provided to the information processing apparatus according to the second embodiment of the present invention.

2-2. Example of Screen (after Cursor Movement) Displayed on Display Surface Provided to Information Processing Apparatus FIG. 12 is a diagram showing an example of the screen (after cursor movement) which is displayed on the display surface provided to the information processing apparatus according to the second embodiment of the present invention. With reference to FIG. 12 (refer to other figures as appropriate), description will be made on the screen (after cursor movement) which is displayed on the display surface provided to the information processing apparatus according to the second embodiment of the present invention.

As shown in FIG. 12, the cursor 113 can be moved to the vicinity of, for example, the object 111b by the operation of the user. When it is determined that the cursor 113 is moved to the vicinity of the object 111b, the information processing apparatus can move the focus 112 to the position of the object 111b. In the present embodiment, the mechanism thereof will be described in detail.

2-3. Outline of Functions of Information Processing Apparatus

Figure 13:
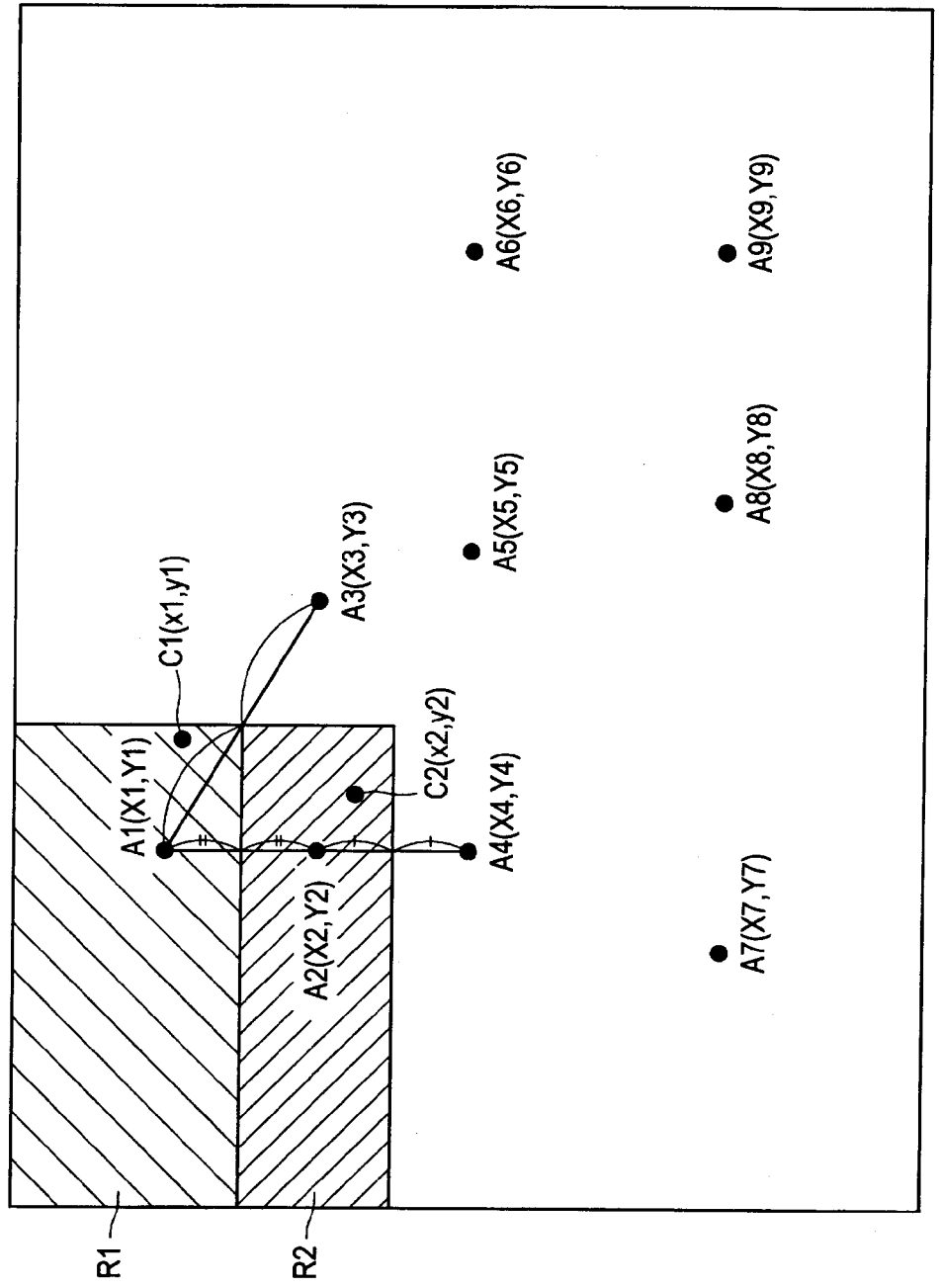
FIG. 13 is a diagram for illustrating an outline of functions of the information processing apparatus according to the embodiment.

FIG. 13 is a diagram for illustrating an outline of functions of the information processing apparatus according to the second embodiment of the present invention. With reference to FIG. 13 (refer to other figures as appropriate), description will be made on the outline of functions of the information processing apparatus according to the second embodiment of the present invention.

The information processing apparatus has a function of receiving, from an information input apparatus which accepted input of a vector on the display surface 111B, the vector. The information input apparatus is not particularly limited as long as it has a function of accepting input of a vector on the display surface 111B from a user, and there can be used as the information input apparatus, for example, a remote control with a touch panel, a mouse, and a joystick.

In the case where a remote control with a touch panel is used as the information input apparatus, information that can be input to the information input apparatus is, for example, a vector indicating a direction in which and a distance which an operating tool such as a finger or a pen is moved by an user's operation of moving the operating tool while keeping the operating tool in contact with the touch panel (drag operation). In the same manner, in the case where a mouse is used as the information input apparatus, information that can be input to the information input apparatus is, for example, a vector indicating a direction in which and a distance which the mouse is moved by an user's operation of moving the mouse (cursor movement operation). In the case where a joystick is used as the information input apparatus, information that can be input to the information input apparatus is, for example, a vector indicating a direction in which the user tilts the joystick and a distance moved by the operation of tilting the joystick.

As shown in FIG. 13, positions of the objects 111a to 111i are represented by A1(X1, Y1) to A9(X9, Y9), respectively. In the example shown in FIG. 13, the centers of the objects 111a to 111i are represented by A1(X1, Y1) to A9(X9, Y9), respectively. However, the position of each of the objects 111a to 111i is not limited to the center of each of the objects 111a to 111i, and may be top-left of each of the objects 111a to 111i, for example.

When the user inputs the vector to the information input apparatus, the information input apparatus accepts the input of the vector, and the information processing apparatus receives the vector from the information input apparatus. The information processing apparatus moves the focus 112 to the position indicated by object position information that is to be newly attended to, which is selected from pieces of object position information A1(X1, Y1) to A9(X9, Y9) based on the direction and distance indicated by the received vector.

For example, in the case where the cursor 113 exists at C1(x1, y1) which is the position within a region R1 to which A1(X1, Y1) belongs, the focus 112 exists at A1(X1, Y1). Here, there is assumed a case where the user inputs to the information input apparatus a vector indicating a direction and distance from C1(x1, y1) to C2(x2, y2) which is the position within a region R2 to which A2(X2, Y2) belongs. In this case, the information processing apparatus causes the cursor 113 to move to C2(x2, y2) and also causes the focus 112 to move to A2(X2, Y2).

The region R1 to which A1(X1, Y1) belongs is a set of positions in which the distance from A1(X1, Y1) to each of the positions is less than the distance from A1(X1, Y1) to each of the other object positions A2(X2, Y2) to A9(X9, Y9). In the same manner, the region R2 to which A2(X2, Y2) belongs is a set of positions in which the distance from A2(X2, Y2) to each of the positions is less than the distance from A2(X2, Y2) to each of the other object positions A1(X1, Y1) and A3(X3, Y3) to A9(X9, Y9). Other regions R3 to R9 (not shown) are also defined similarly.

2-4. Configuration of Information Processing System

Figure 14:
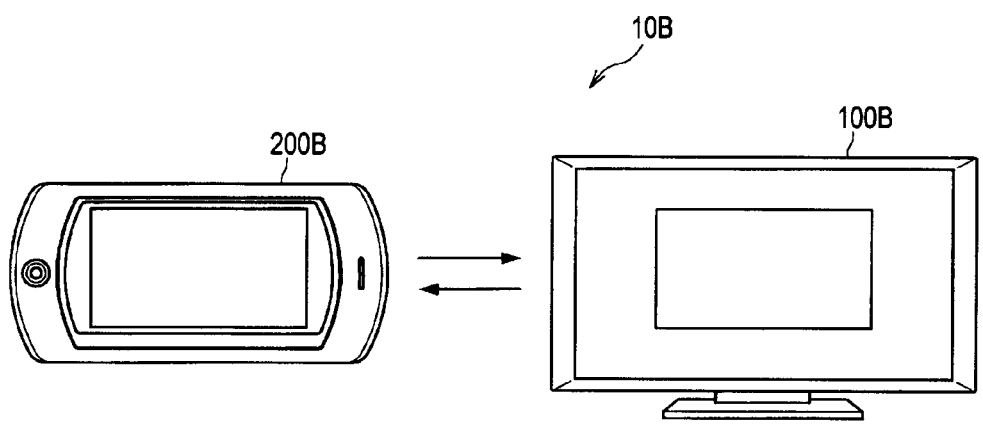
FIG. 14 is a diagram showing a configuration of an information processing system according to the embodiment.

FIG. 14 is a diagram showing a configuration of an information processing system according to the second embodiment of the present invention. With reference to FIG. 14 (refer to other figures as appropriate), description will be made on the configuration of the information processing system according to the second embodiment of the present invention.

As shown in FIG. 14, an information processing system 10B according to the second embodiment of the present invention includes an information processing apparatus 100B and an information input apparatus 200B. As described above, the information processing apparatus 100B has at least the display surface 111B, and includes a display section which can display information on the display surface 111B. Therefore, the information processing apparatus 100B is not particularly limited as long as it has the display section, and there can be used, for example, PC and a TV set as the information processing apparatus 100B.

As described above, the information input apparatus 200B has at least functions of accepting input of a vector on the display surface 111B and transmitting the accepted vector to the information processing apparatus 100B via wire or radio. Therefore, the information input apparatus 200B is not particularly limited as long as it has those functions, and as described above, there can be used as the information input apparatus 200B, a remote control with a touch panel, a mouse, a joystick, and the like.

2-5. Functional Configuration of Information Processing Apparatus

Figure 15:
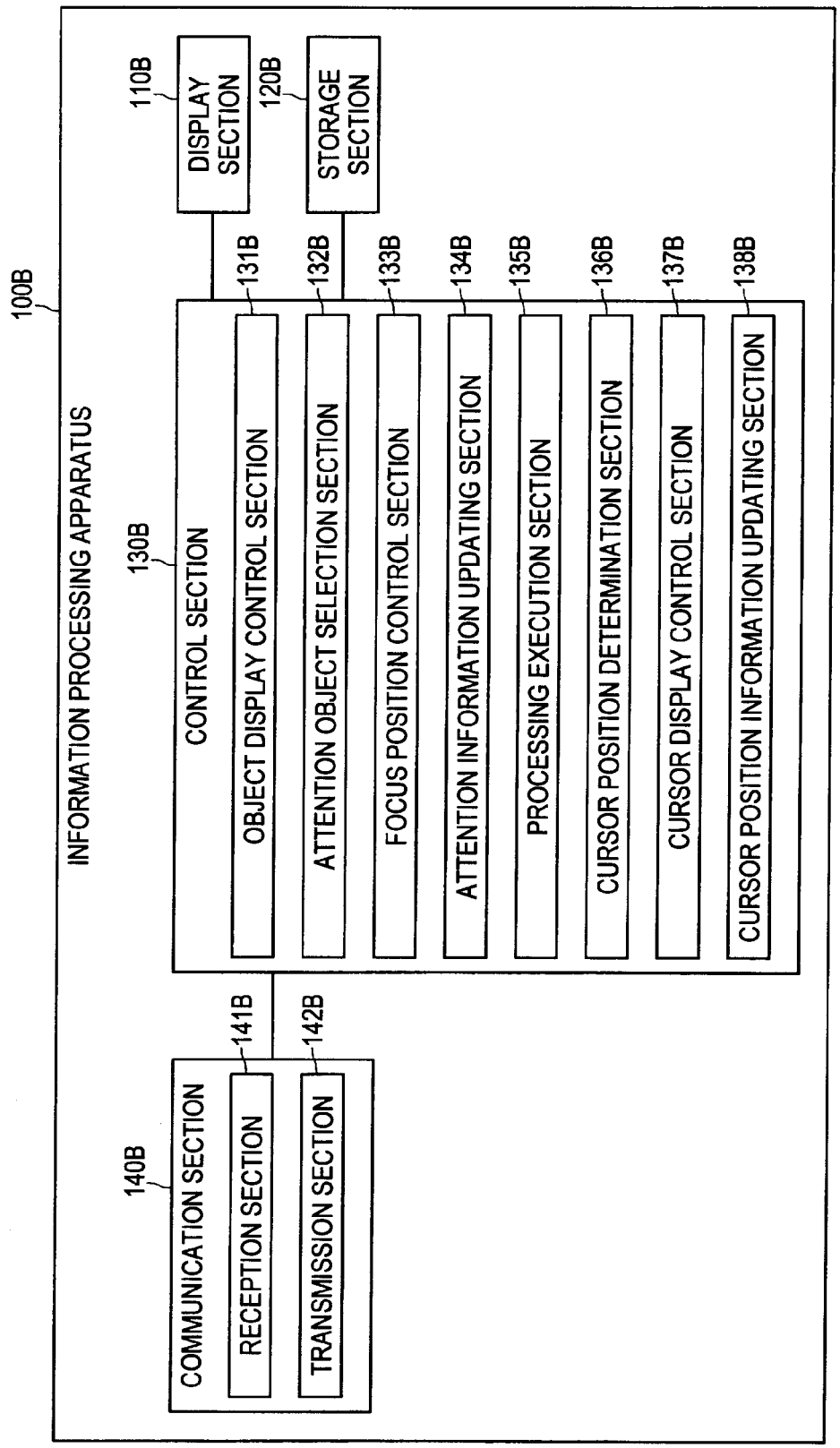
FIG. 15 is a diagram showing a functional configuration of the information processing apparatus according to the embodiment.

FIG. 15 is a diagram showing a functional configuration of the information processing apparatus according to the second embodiment of the present invention. With reference to FIG. 15 (refer to other figures as appropriate), description will be made on the functional configuration of the information processing apparatus according to the second embodiment of the present invention.

As shown in FIG. 15, the information processing apparatus 100B includes a display section 110B, a storage section 120B, a control section 130B, and a communication section 140B.

The display section 110B includes a display device, for example. The display section 110B has the display surface 111B and is capable of causing information to be displayed on the display surface 111B. The information to be displayed on the display surface 111B is output from the control section 130B, for example. Further, the display section 110B may exist outside the information processing apparatus 100B.

The storage section 120B includes a RAM, for example, and has a function of storing a program or data used when the control section 130B executes the program. As the data used when the control section 130B executes the program, there can be exemplified pieces of object position information (X1, Y1) to (X9, Y9) indicating positions of the objects 111a to 111i on the display surface 111B, respectively, and attention information for specifying at least one of the pieces of object position information (X1, Y1) to (X9, Y9). Further, as the data used when the control section 130B executes the program, there can be exemplified cursor position information. The respective pieces of object position information (X1, Y1) to (X9, Y9), the attention information, and the cursor position information will be described later with additional reference to FIG. 16.

The communication section 140B has, for example, a reception section 141B and a transmission section 142B, and includes a communication device, for example. The reception section 141B has a function of receiving a vector indicating a direction and distance on the display surface 111B from the information input apparatus 200B. The transmission section 142B has a function of transmitting various pieces of information to the information input apparatus 200B.

The control section 130B includes a CPU, for example, and has an object display control section 131B, an attention object selection section 132B, a focus position control section 133B, a cursor position determination section 136B, a cursor display control section 137B, and the like. The function of the control section 130B is realized by, for example, the CPU developing a program stored by a non-volatile memory in the RAM and executing the program developed in the RAM. The control section 130B determines whether information for identifying any of a vector and processing request is included in transmission information received by the reception section 141B. In the case where the control section 130B determines that the transmission information includes information for identifying any of the above, the control section 130B acquires the identification information from the transmission information, and performs control in accordance with the information identified by the acquired identification information.

The object display control section 131B has a function of causing the objects 111a to 111i to be displayed at the positions on the display surface 111B indicated by the pieces of object position information (X1, Y1) to (X9, Y9), respectively.

The cursor position determination section 136B has a function of determining new cursor position information based on the vector received by the reception section 141B. The cursor position determination section 136B determines, as new cursor position information, the position information indicating the position to which the cursor 113 is moved in the direction indicated by the vector received by the reception section 141B and along the distance indicated by the vector received by the reception section 141B. In the example described above, the cursor position determination section 136B determines C2(x2, y2) as the new cursor position information.

The cursor display control section 137B has a function of causing the cursor 113 to be displayed at a position on the display surface 111B indicated by the cursor position information stored in the storage section 120B. Further, the cursor display control section 137B has a function of causing the cursor 113 to move to a position on the display surface 111B indicated by the new cursor position information determined by the cursor position determination section 136B. In the example described above, the cursor display control section 137B causes the cursor 113 to move from C1(x1, y1) to C2(x2, y2).

The attention object selection section 132B has a function of selecting, from the pieces of object position information (X1, Y1) to (X9, Y9), information indicating the closest position from the position indicated by the new cursor position information as new attention object position information indicating a position of an object that is to be newly attended to. In the example described above, the attention object selection section 132B selects (X2, Y2), which is the information indicating the closest position from the position indicated by the new cursor position information (x2, y2), from among the pieces of object position information (X1, Y1) to (X9, Y9).

The focus position control section 133B has a function of causing the focus 112 to be displayed at a position on the display surface 111B indicated by the object position information specified by the attention information. Further, the focus position control section 133B has a function of causing the focus 112 to move to a position on the display surface 111B indicated by the new attention object position information selected by the attention object selection section 132B.

The cursor position determination section 136B may determine the new cursor position information based on, for example, the cursor position information stored in the storage section 120B and the vector received by the reception section 141B.

The cursor position determination section 136B may also determine the new cursor position information by adding the vector received by the reception section 141B to the cursor position information stored in the storage section 120B. In the example described above, in the case where the cursor position information stored in the storage section 120B is (x1, y1) and the vector (x2-x1, y2-y1) is received by the reception section 141B, the cursor position determination section 136B adds the vector (x2-x1, y2-y1) to C1(x1, y1), to thereby determine the new cursor position information (x2, y2).

The attention object selection section 132B acquires object position information indicating the closest position from the position indicated by the new cursor position information from among the pieces of object position information (X1, Y1) to (X9, Y9). In this case, when a distance between the positions indicated by the acquired object position information and the new cursor position information, respectively, is larger than a threshold value, the attention object selection section 132B may not use the acquired object position information as the new attention object position information.

For example, there is assumed a case where the attention object selection section 132B acquires (X2, Y2) as the object position information indicating the closest position from the position indicated by the new cursor position information (x2, y2) from among the pieces of object position information (X1, Y1) to (X9, Y9). In this case, when the distance from the position indicated by (X2, Y2) to the position indicated by (x2, y2) is larger than a threshold value, the attention object selection section 132B may not use (X2, Y2) as the new attention object position information. In this way, for example, when the distance from the cursor position to the object position is large, it can be assumed that it is the case where the user is not intended to move the focus 112, and hence, it is possible not to move the focus 112. As the threshold value, there can be used a value stored in the storage section 120B, for example.

The control section 130B may further include an attention information updating section 134B. In this case, the attention information updating section 134B updates the attention information stored in the storage section 120B by the information for specifying the new attention object position information. In this way, the control section 130B can perform similar processing again by using the updated attention information.

The control section 130B may further include a cursor position information updating section 138B. In this case, the cursor position information updating section 138B updates the cursor position information stored in the storage section 120B by the new cursor position information determined by the cursor position determination section 136B. In this way, the control section 130B can perform similar processing again by using the updated cursor position information.

The control section 130B may further include a processing execution section 135B. There is assumed a case where the reception section 141B further receives a processing request indicating that processing is to be executed from the information input apparatus 200B. In this case, when the processing request is received by the reception section 141B, the processing execution section 135B executes processing corresponding to the new attention object position information. As the processing corresponding to the new attention object position information, in the case where, for example, (X1, Y1) is selected as the new attention object position information, there can be assumed processing for inputting a character string in a text box which is the object 111*a* displayed at the position indicated by (X1, Y1). Further, for example, in the case where (X9, Y9) is selected as the new attention object position information, data registration is performed as processing corresponding to the object 111*i* displayed at the position indicated by (X9, Y9).

In the case where a remote control with a touch panel is used as the information input apparatus, the processing request can be input to the information input apparatus by, for example, an operation of touching the touch panel with an operating tool such as a finger or a pen (tap operation). In the same manner, in the case where a mouse is used as the information input apparatus, the processing request can be input to the information input apparatus by, for example, an operation of the user clicking the mouse (click operation). In the case where a joystick is used as the information input apparatus, the processing request can be input to the information input apparatus by, for example, an operation of the user pressing a button provided to the joystick.

Figure 16:
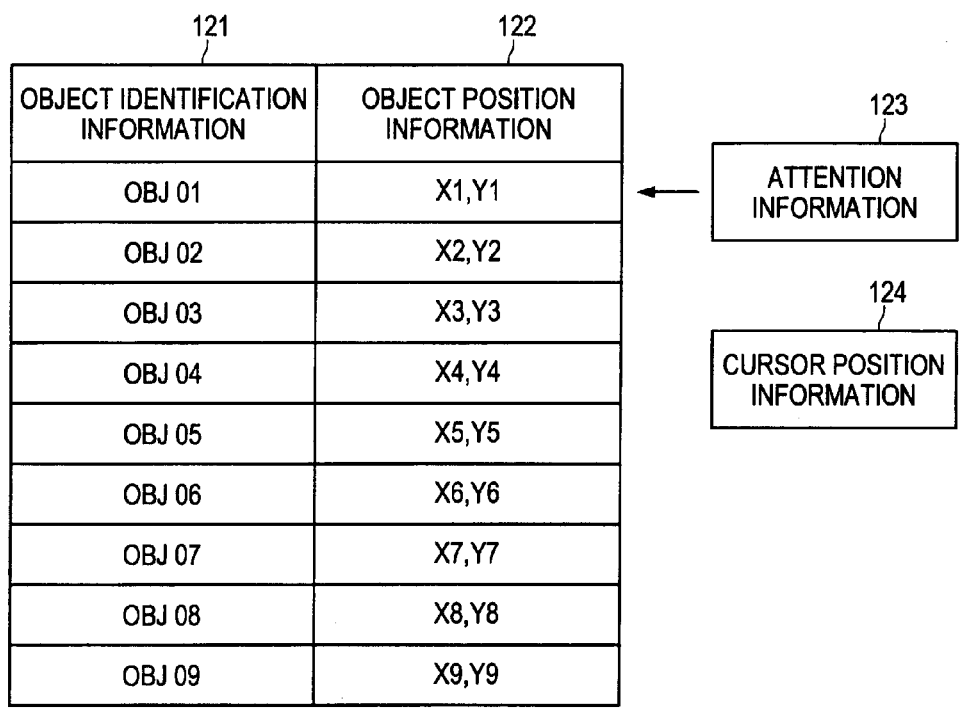
FIG. 16 is a diagram showing examples of various pieces of information stored in a storage section of the information processing apparatus according to the embodiment.

2-6. Examples of Various Pieces of Information Stored in Storage Section of Information Processing Apparatus FIG. 16 is a diagram showing examples of various pieces of information stored in a storage section of the information processing apparatus according to the second embodiment of the present invention. With reference to FIG. 16 (refer to other figures as appropriate), description will be made on the various pieces of information stored in the storage section of the information processing apparatus according to the second embodiment of the present invention.

As shown in FIG. 16, the storage section 120B of the information processing apparatus 100B according to the second embodiment of the present invention stores object identification information 121 and object position information 122, the object identification information 121 and the object position information 122 being correlated with each other. In addition thereto, the storage section 120B stores attention information 123, cursor position information 124, and the like.

The object identification information 121 is for identifying pieces of object data used for displaying the objects 111*a* to 111*i*. For example, the object data used for displaying the object 111*a* includes image data or the like for displaying a text box, and the object data used for displaying the object 111*g* includes character code or the like. The object data is stored in the storage section 120B, for example.

The object position information 122 is position information for indicating a position at which each of the objects 111*a* to 111*i* is displayed on the display surface 111B. The object position information 122 may be a fixed value or may be a changeable value. For example, in the case where the objects 111*a* to 111*i* are pasted within a window displayed on the display surface 111B and the control section 130B causes the window to move in accordance with the operation of the user, the object position information 122 may be changed in accordance with the movement distance of the window.

The attention information 123 is information for specifying at least one of the pieces of object position information (X1, Y1) to (X9, Y9). In FIG. 16, there is shown a case where the information for specifying (X1, Y1) is set as the attention information 123. As the attention information 123, there can be used an address indicating a location in the storage section 120B at which the object position information 122 is stored.

The cursor position information 124 is position information indicating a position on the display surface 111B at which the cursor 113 is displayed. The cursor position information 124 is updated by the information processing apparatus in accordance with a vector transmitted from the information input apparatus.

2-7. Stages of Movement of Focus Displayed on Display Surface of Information Processing Apparatus As shown in FIG. 6, in moving the focus 112, the focus position control section 133B may cause the focus 112 during the stages of movement to be displayed on the display surface 111B. In this way, the user can visually understand the stages of the focus 112 moving from the initial position to the destination position. In FIG. 6, there are shown the stages of the focus 112 moving from the object 111*a* to the object 111*b*.

In displaying the focus 112 during the stages of movement on the display surface 111B, the focus position control section 133B may gradually slow down the movement speed of the focus 112. In FIG. 6, there are shown the positions of the focus 112 displayed on the display surface 111B at the times t, t+Δt, t+2Δt, t+3Δt, t+4Δt, and t+5Δt. In this way, the user can more naturally understand the destination position of the focus 112.

The focus position control section 133B may gradually enlarge or reduce the size of the focus 112 in accordance with the size of the object displayed at the position on the display surface 111B indicated by the object position information specified by the attention information and the size of the object displayed at the position on the display surface 111B indicated by the new attention object position information.

In FIG. 6, there is shown a case where the object displayed at the position on the display surface 111B indicated by the object position information (X1, Y1) specified by the attention information is the object 111*a*, and the object displayed at the position on the display surface 111B indicated by the new attention object position information (X2, Y2) is the object 111*b*. In this case, because the object 111*a* is larger than the object 111*b*, the focus position control section 133B may gradually reduce the size of the focus 112, for example, as shown in FIG. 6.

Further, for example, there is considered a case where the object displayed at the position on the display surface 111B indicated by the object position information (X2, Y2) specified by the attention information is the object 111*b*, and the object displayed at the position on the display surface 111B indicated by the new attention object position information (X4, Y4) is the object 111*d*. In this case, because the object 111*b* is smaller than the object 111*d*, the focus position control section 133B may gradually enlarge the size of the focus 112, for example.

In displaying the focus 112 during the stages of movement on the display surface 111B, the focus position control section 133B may gradually decrease and then increase the transmittance of the focus 112. In FIG. 6, there are shown the stages in which the transmittance of the focus 112 is decreased as the time elapses in the order of t, t+Δt, and t+2Δt, and the transmittance of the focus 112 is increased as the time elapses in the order of t+3Δt, t+4Δt, and t+5Δt. In this way, the user can more naturally understand the stages of movement of the focus 112. When the transmittance is represented by α, the pixel value of the position at which the focus 112 is displayed, for example, can be calculated by, for example, (pixel value of background)×(1−α)+(pixel value of focus 112)×α.

2-8. Functional Configuration of Information Input Apparatus

Figure 17:
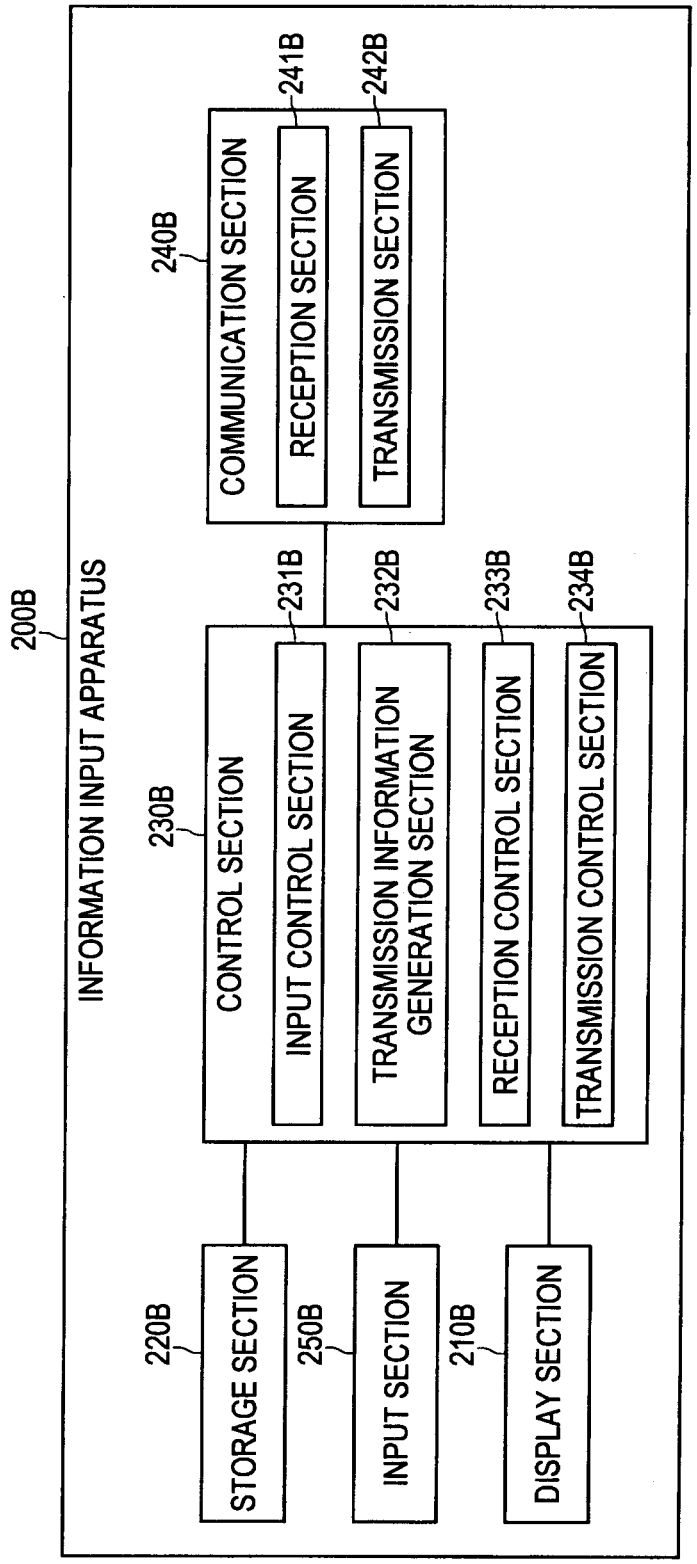
FIG. 17 is a diagram showing a functional configuration of an information input apparatus according to the embodiment.

FIG. 17 is a diagram showing a functional configuration of an information input apparatus according to the second embodiment of the present invention. With reference to FIG. 17 (refer to other figures as appropriate), description will be made on the functional configuration of the information input apparatus according to the second embodiment of the present invention.

As shown in FIG. 17, the information input apparatus 200B includes at least a communication section 240B and an input section 250B. Further, the information input apparatus 200B includes as necessary, a display section 210B, a storage section 220B, a control section 230B, and the like.

The input section 250B has a function of accepting input of vector on the display surface 111B. Further, the input section 250B may have a function of further accepting input of a processing request. As described above, the input section 250B includes, for example, a touch panel, a mouse, and a joystick, and may be any input device as long as it has a function of accepting the input of a vector on the display surface 111B.

The communication section 240B has a reception section 241B, a transmission section 242B, and the like, and includes, for example, a communication device. The reception section 241B has a function of receiving various pieces of information from the information processing apparatus 100B. The transmission section 242B has a function of transmitting various pieces of information to the information processing apparatus 100B, and has, for example, a function of transmitting the vector the input of which is accepted by the input section 250B. Further, the communication section 240B may further have a function of transmitting the processing request and the like, the input of which is accepted by the input section 250B to the information processing apparatus 100B.

The display section 210B includes a display device, for example. The display section 210B has a display surface (not shown) and is also capable of displaying information on the display surface (not shown). In the case where a touch panel is used as the input section 250B, correspondence information may be stored in the storage section 220B, the correspondence information being formed of position information indicating a position on the touch panel and position information indicating a position on the display surface (not shown) which are correlated with each other. In this case, an input control section 231B can figure out, by referring to the correspondence information, the correlation between the position information indicating a position on the touch panel and the position information indicating a position on the display surface (not shown). The information to be displayed on the display surface (not shown) is output from the control section 230B, for example. Further, the display section 210B may exist outside the information input apparatus 200B.

The storage section 220B includes a RAM, for example, and has a function of storing a program or data used when the control section 230B executes the program.

The control section 230B includes a CPU, for example, and has the input control section 231B, a transmission information generation section 232B, a reception control section 233B, a transmission control section 234B, and the like. The function of the control section 230B is realized by, for example, the CPU developing a program stored by a non-volatile memory in the RAM and executing the program developed in the RAM.

The input control section 231B has a function of acquiring various pieces of information from the input section 250B, the input of which is accepted by the input section 250B. The various pieces of information acquired by the input control section 231B are output to the transmission information generation section 232B, for example.

The transmission information generation section 232B has a function of generating transmission information to be transmitted to the information processing apparatus 100B by determining the various pieces of information acquired by the input control section 231B. In the case where, for example, the transmission information generation section 232B determines that a vector is included in the information acquired by the input control section 231B, the transmission information generation section 232B generates transmission information including information for identifying the vector and the vector. In the case where, for example, the transmission information generation section 232B determines that a processing request is included in the information acquired by the input control section 231B, the transmission information generation section 232B generates transmission information including information for identifying the processing request.

The reception control section 233B has a function of acquiring the various pieces of information received by the reception section 241B. The various pieces of information acquired by the reception control section 233B is determined by the control section 230B, and the control in accordance with the determination results is performed by the control section 230B.

The transmission control section 234B has a function of transmitting the transmission information generated by the transmission information generation section 232B to the information processing apparatus 100B via wire or radio.

2-9. Hardware Configuration of Information Processing Apparatus

Figure 18:
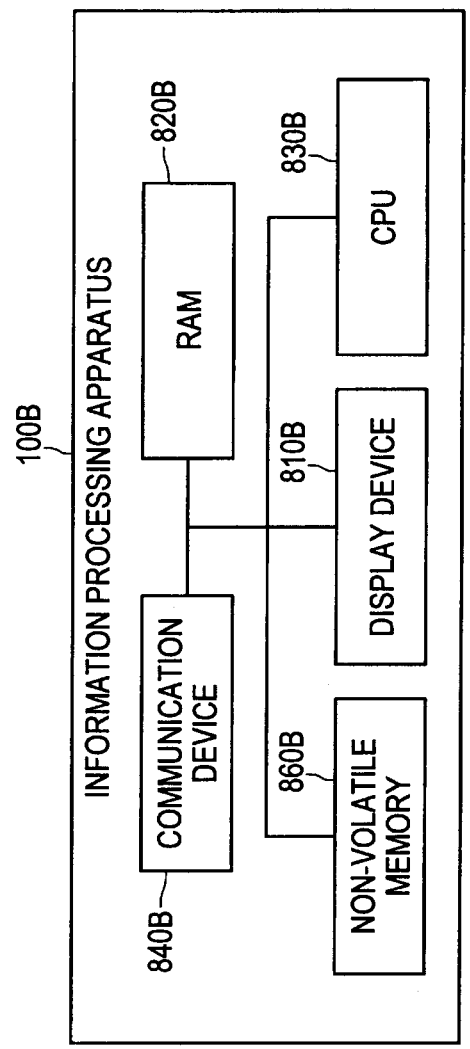
FIG. 18 is a diagram showing a hardware configuration of the information processing apparatus according to the embodiment.

FIG. 18 is a diagram showing a hardware configuration of the information processing apparatus according to the second embodiment of the present invention. With reference to FIG. 18 (refer to other figures as appropriate), description will be made on the hardware configuration of the information processing apparatus according to the second embodiment of the present invention.

As shown in FIG. 18, the information processing apparatus 100B mainly includes, for example, a display device 810B, a RAM 820B, a CPU 830B, a communication device 840B, and a non-volatile memory 860B. However, hardware provided to the information processing apparatus 100B is not limited thereto, and may be replaced with other hardware or may be added with other hardware, as appropriate.

The display device 810B includes a display surface, and is capable of causing information to be displayed on the display surface. The display device 810B includes a device such as an LCD or an organic EL display device, which is capable of visually notifying the user of the information. For example, the display device 810B outputs the results obtained by various processing performed by the information processing apparatus 100B in a form of a text or an image.

The RAM 820B primarily stores a program executed by the CPU 830B, data used when the program is executed, and the like.

The CPU 830B functions as an arithmetic processing unit and a control unit and controls the overall operation inside the information processing apparatus 100B or a portion thereof according to various programs recorded in the RAM 820B and the non-volatile memory 860B.

The communication device 840B has a function of performing communication with the information input apparatus 200B. The communication device 840B is capable of, by instruction from the CPU 830B, receiving a signal from the information input apparatus 200B via wire or radio and transmitting a signal to the information input apparatus 200B via wire or radio.

The non-volatile memory 860B is a device for storing data, and includes, for example, a magnetic storage device such as an HDD, a semiconductor storage device, an optical storage device, and a magneto-optical storage device. The non-volatile memory 860B stores, for example, programs executed by the CPU 830B and various kinds of data.

In the foregoing, an example of the hardware configuration which can realize the function of the information processing apparatus 100B according to the second embodiment of the present invention has been shown. Each of the above components may be configured using general-purpose members or hardware specialized for the function of each component. Therefore, the hardware configuration to be used can be changed appropriately in accordance with the technical level each time when the present embodiment is carried out.

2-10. Hardware Configuration of Information Input Apparatus

Figure 19:
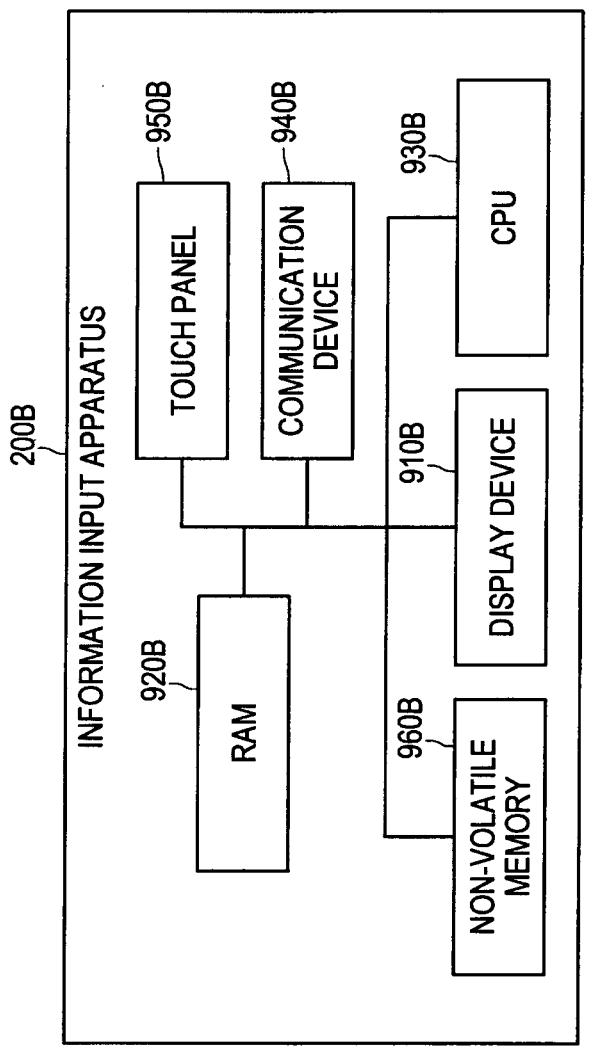
FIG. 19 is a diagram showing a hardware configuration of the information input apparatus according to the embodiment.

FIG. 19 is a diagram showing a hardware configuration of the information input apparatus according to the second embodiment of the present invention. With reference to FIG. 19 (refer to other figures as appropriate), description will be made on the hardware configuration of the information input apparatus according to the second embodiment of the present invention.

As shown in FIG. 19, the information input apparatus 200B mainly includes, for example, a display device 910B, a RAM 920B, a CPU 930B, a communication device 940B, a touch panel 950B, and a non-volatile memory 960B. However, hardware provided to the information input apparatus 200B is not limited thereto, and may be replaced with other hardware or may be added with other hardware, as appropriate. For example, the information input apparatus 200B may include the display device 910B according to the needs of the user. Further, another device which is capable of accepting the input of position information from the user can be used instead of the touch panel 950B, and, for example, a mouse or a joystick can be used therefor.

The display device 910B includes a display surface, and is capable of causing information to be displayed on the display surface. The display device 910B includes a device such as an LCD or an organic EL display device, which is capable of visually notifying the user of the information. For example, the display device 910B outputs the results obtained by various processing performed by the information input apparatus 200B in a form of a text or an image.

The RAM 920B primarily stores a program executed by the CPU 930B, data used when the program is executed, and the like.

The CPU 930B functions as an arithmetic processing unit and a control unit and controls the overall operation inside the information input apparatus 200B or a portion thereof according to various programs recorded in the RAM 920B and the non-volatile memory 960B.

The communication device 940B has a function of performing communication with the information processing apparatus 100B. The communication device 940B is capable of, by instruction from the CPU 930B, receiving a signal from the information processing apparatus 100B via wire or radio and transmitting a signal to the information processing apparatus 100B via wire or radio.

The touch panel 950B has a contact surface, and outputs, to the CPU 930B as an information signal, position information indicating a position on the contact surface at which an operating tool (such as a user's finger or a pen) touches. The user causes the operating tool to touch the touch panel 950B, to thereby input various kinds of data and instruct processing operation to the information input apparatus 200B. As the touch panel 950B, any can be used as long as it can detect the position on the contact surface at which the operating tool touches.

The non-volatile memory 960B is a device for storing data, and includes, for example, a magnetic storage device such as an HDD, a semiconductor storage device, an optical storage device, and a magneto-optical storage device. The non-volatile memory 960B stores, for example, programs executed by the CPU 930B and various kinds of data.

In the foregoing, an example of the hardware configuration which can realize the function of the information input apparatus 200B according to the second embodiment of the present invention has been shown. Each of the above components may be configured using general-purpose members or hardware specialized for the function of each component. Therefore, the hardware configuration to be used can be changed appropriately in accordance with the technical level each time when the present embodiment is carried out.

2-11. Flow of Operation of Information Processing Apparatus

Figure 20:
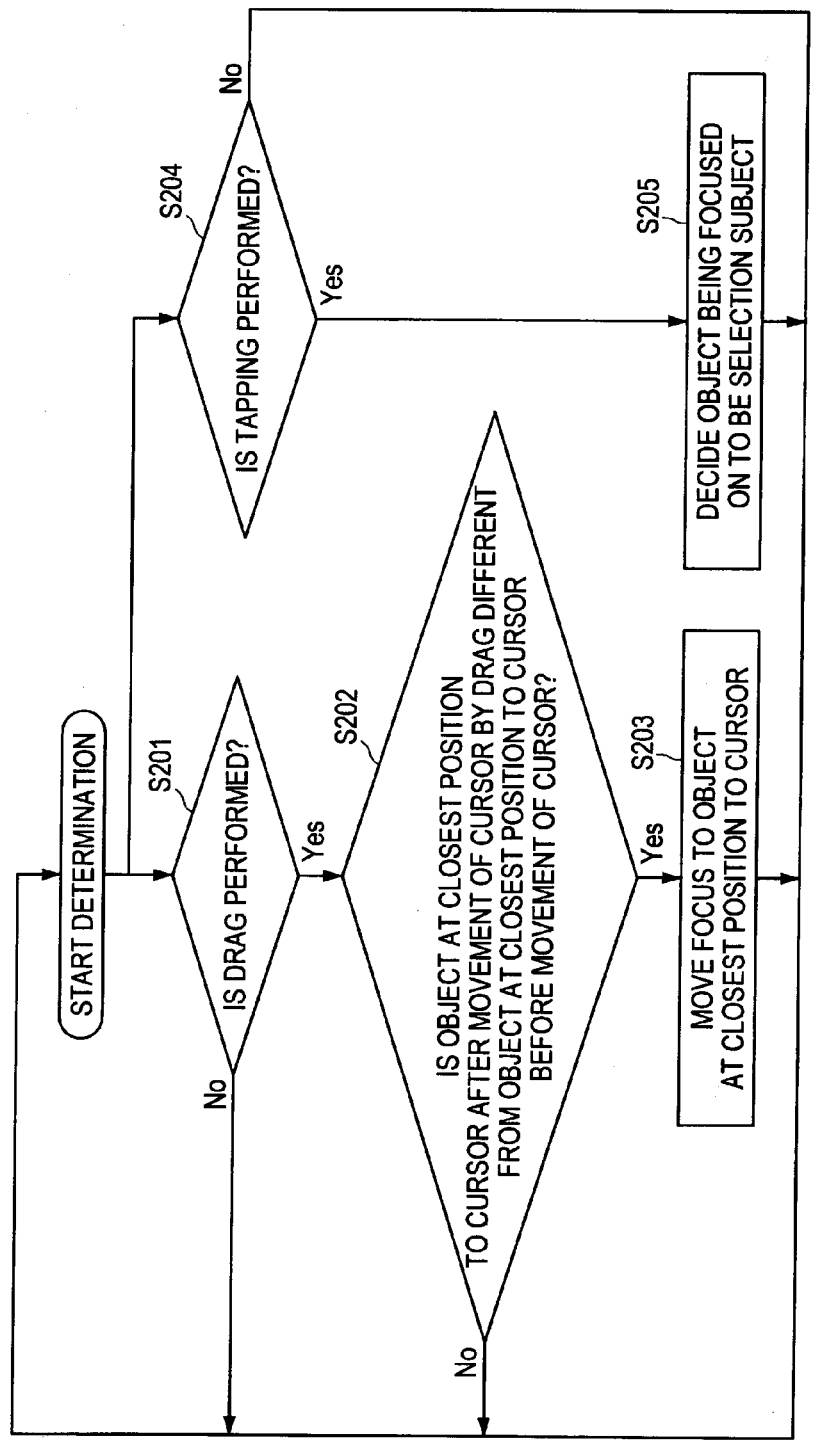
FIG. 20 is a flowchart showing a flow of operation of the information processing apparatus according to the embodiment.

FIG. 20 is a flowchart showing a flow of operation of the information processing apparatus according to the second embodiment of the present invention. With reference to FIG. 20 (refer to other figures as appropriate), description will be made on the flow of operation of the information processing apparatus according to the second embodiment of the present invention. Note that described herein are examples in which a vector and a processing request are each input to the information input apparatus 200B by a drag operation and a tap operation.

As shown in FIG. 20, the information processing apparatus 100B starts to determine the operation of the user, and determines whether the user performs a drag operation (Step S201). In the case where it is determined that the user does not perform the drag operation ("No" at Step S201), the information processing apparatus 100B further determines the operation of the user. In the case where it is determined that the user performs the drag operation ("Yes" at Step S201), the information processing apparatus 100B determines whether an object at the closest position to the cursor 113 after the movement of the cursor by the drag operation is different from the object at the closest position to the cursor 113 before the movement of the cursor by the drag operation (Step S202).

In the case where it is determined that the object at the closest position to the cursor 113 after being moved by the drag operation is not different from the object at the closest position to the cursor 113 before being moved by the drag operation ("No" at Step S202), the information processing apparatus 100B further determines the operation of the user. In the case where it is determined that the object at the closest position to the cursor 113 after being moved by the drag operation is different from the object at the closest position to the cursor 113 before being moved by the drag operation ("Yes" at Step S202), the information processing apparatus 100B moves the focus 112 to the object at the closest position to the cursor 113 (Step S203), and further determines the operation of the user.

Further, the information processing apparatus 100B starts to determine the operation of the user, and determines whether the user performs the tap operation (Step S204). In the case where it is determined that the user does not perform the tap operation ("No" at Step S204), the information processing apparatus 100B further determines the operation of the user. In the case where it is determined that the user performs the tap operation ("Yes" at Step S204), the information processing apparatus 100B decides the object being focused on with the focus 112 to be the selection subject (Step S205), and further determines the operation of the user.

2-12. Modified Example

It should be understood by those skilled in the art that various modifications, combinations, sub-combinations and alterations may occur depending on design requirements and other factors insofar as they are within the scope of the appended claims or the equivalents thereof.

3. Summary

According to the first embodiment and the second embodiment, the information processing apparatus 100A enables the user to easily input information for selecting a desired object from among the objects displayed on the display surface 111A.

Further, it is not necessary any more that a user moves, while watching a cursor displayed on the display surface 111A, the cursor onto the desired object. Therefore, the issue that it is difficult to adjust a direction and a distance to be input to information input apparatus 200A is solved.

Further, the issue is solved, that it is difficult for a user to determine which of the left, right, up, and down directions, based on a object currently being focused on with the focus 112, a direction of a desired object corresponds to. Further, the possibility that an error occurs on the direction determined by the user can be lowered, and hence, the possibility that the focus 112 is not moved to the desired object can be lowered. Therefore, the burden imposed on the operation of the user can be reduced.

The present application contains subject matter related to that disclosed in Japanese Priority Patent Application JP 2009-204016 filed in the Japan Patent Office on Sep. 3, 2009, the entire content of which is hereby incorporated by reference.

What is claimed is:

1. An information processing apparatus comprising:
    a display section which has a display surface and is capable of displaying information on the display surface;
    a storage section which stores pieces of object position information indicating positions of a plurality of objects on the display surface, and also stores cursor position information indicating a position of a cursor on the display surface and attention information for specifying at least one of the pieces of object position information;
    an object display control section which causes the plurality of objects to be displayed at the positions on the display surface indicated by the pieces of object position information;
    a reception section which receives, from an information input apparatus which accepted input of a vector on the display surface, the vector;
    a cursor position determination section which determines new cursor position information based on the vector received by the reception section;
    a cursor display control section which causes the cursor to be displayed at a position on the display surface indicated by the cursor position information stored in the storage section, and also causes the cursor to move to a position on the display surface indicated by the new cursor position information determined by the cursor position determination section;
    an attention object selection section which selects, from the pieces of object position information, information indicating the closest position from the position indicated by the new cursor position information as new attention object position information indicating a position of an object that is to be newly attended to; and
    a focus position control section which causes a focus to be displayed at a position on the display surface indicated by the object position information specified by the attention information, and also causes the focus to move to a position on the display surface indicated by the new attention object position information, wherein, in moving the focus, the focus position control section causes the focus during stages of movement to be displayed on the display surface, and the focus position control section gradually decreases and then increases a transmittance of the focus in accordance with time elapses of the stages of movement, and
    wherein, in moving the focus, the focus position control section gradually decreases the transmittance of the focus from when the focus is displayed at the position on the display surface indicated by the object position information specified by the attention information, to when the focus is displayed at a position that is located in-between the position on the display surface indicated by the object position information specified by the attention information and the position on the display surface indicated by the new attention object position information, and the focus position control section gradually increases the transmittance of the focus from when the focus is displayed at the position that is located in-between the position on the display surface indicated by the object position information specified by the attention information and the position on the display surface indicated by the new attention object position information, to when the focus is displayed at the position on the display surface indicated by the new attention object position information.

2. The information processing apparatus according to claim 1,
    wherein the cursor position determination section determines the new cursor position information based on the cursor position information stored in the storage section and the vector received by the reception section.

3. The information processing apparatus according to claim 2,
    wherein the cursor position determination section determines the new cursor position information by adding the vector received by the reception section to the cursor position information stored in the storage section.

4. The information processing apparatus according to claim 1,
    wherein the attention object selection section acquires object position information indicating the closest position from the position indicated by the new cursor position information from among the pieces of object position information, and when a distance between the positions indicated by the acquired object position information and the new cursor position information, respectively, is larger than a threshold value, the attention object selection section does not use the acquired object position information as the new attention object position information.

5. The information processing apparatus according to claim 1,
    wherein, in causing the focus during stages of movement to be displayed on the display surface, the focus position control section gradually slows down the movement speed of the focus.

6. The information processing apparatus according to claim 1,
    wherein the focus position control section gradually enlarges or reduces a size of the focus in accordance with a size of the object displayed at the position on the display surface indicated by the object position information specified by the attention information and a size of the object displayed at the position on the display surface indicated by the new attention object position information.

7. The information processing apparatus according to claim 1, further comprising
    a processing execution section,
    wherein the reception section further receives, from the information input apparatus which further accepts input of a processing request indicating that processing is to be executed, the processing request, and
    wherein, when the processing request is received by the reception section, the processing execution section executes processing corresponding to the new attention object position information.

8. The information processing apparatus according to claim 1, further comprising
    an attention information updating section which updates the attention information stored in the storage section by the information for specifying the new attention object position information.

9. The information processing apparatus according to claim 1, further comprising
    a cursor position information updating section which updates the cursor position information stored in the storage section by the new cursor position information determined by the cursor position determination section.

10. An information processing method performed by an information processing apparatus which includes a display section which has a display surface and is capable of displaying information on the display surface, a storage section which stores pieces of object position information indicating positions of a plurality of objects on the display surface, and also stores cursor position information indicating a position of a cursor on the display surface and attention information for specifying at least one of the pieces of object position information, an object display control section, a reception section, a cursor position determination section, a cursor display control section, an attention object selection section, and a focus position control section, comprising the steps of:
    causing, by the object display control section, the plurality of objects to be displayed at the positions on the display surface indicated by the pieces of object position information;
    receiving, by the reception section, from an information input apparatus which accepted input of a vector on the display surface, the vector;
    determining, by the cursor position determination section, new cursor position information based on the vector received by the reception section;
    causing, by the cursor display control section, the cursor to be displayed at a position on the display surface indicated by the cursor position information stored in the storage section, and also causing the cursor to move to a position on the display surface indicated by the new cursor position information determined by the cursor position determination section;
    selecting, by the attention object selection section, from the pieces of object position information, information indicating the closest position from the position indicated by the new cursor position information as new attention object position information indicating a position of an object that is to be newly attended to; and
    causing, by the focus position control section, a focus to be displayed at a position on the display surface indicated by the object position information specified by the attention information, causing the focus to move to a position on the display surface indicated by the new attention object position information, and in moving the focus,
    causing the focus during stages of movement to be displayed on the display surface, and causing a transmittance of the focus to gradually decrease and then increase in accordance with time elapses of the stages of movement,
    wherein, in moving the focus, the transmittance of the focus is gradually decreased from when the focus is displayed at the position on the display surface indicated by the object position information specified by the attention information, to when the focus is displayed at a position that is located in-between the position on the display surface indicated by the object position information specified by the attention information and the position on the display surface indicated by the new attention object position information, and the transmittance of the focus is gradually increased from when the focus is displayed at the position that is located in-between the position on the display surface indicated by the object position information specified by the attention information and the position on the display surface indicated by the new attention object position information, to when the focus is displayed at the position on the display surface indicated by the new attention object position information.

11. A non-transitory computer-readable medium having stored therein a program for causing a computer to function as an information processing apparatus which includes
    a display section which has a display surface and is capable of displaying information on the display surface,
    a storage section which stores pieces of object position information indicating positions of a plurality of objects on the display surface, and also stores cursor position information indicating a position of a cursor on the display surface and attention information for specifying at least one of the pieces of object position information,
    an object display control section which causes the plurality of objects to be displayed at the positions on the display surface indicated by the pieces of object position information,
    a reception section which receives, from an information input apparatus which accepted input of a vector on the display surface, the vector,
    a cursor position determination section which determines new cursor position information based on the vector received by the reception section,
    a cursor display control section which causes the cursor to be displayed at a position on the display surface indicated by the cursor position information stored in the storage section, and also causes the cursor to move to a position on the display surface indicated by the new cursor position information determined by the cursor position determination section, an attention object selection section which selects, from the pieces of object position information, information indicating the closest position from the position indicated by the new cursor position information as new attention object position information indicating a position of an object that is to be newly attended to, and a focus position control section which causes a focus to be displayed at a position on the display surface indicated by the object position information specified by the attention information, and also causes the focus to move to a position on the display surface indicated by the new attention object position information, wherein, in moving the focus, the focus position control section causes the focus during stages of movement to be displayed on the display surface, and the focus position control section gradually decreases and then increases a transmittance of the focus in accordance with time elapses of the stages of movement, and wherein, in moving the focus, the focus position control section gradually decreases the transmittance of the focus from when the focus is displayed at the position on the display surface indicated by the object position information specified by the attention information, to when the focus is displayed at a position that is located in-between the position on the display surface indicated the object position information specified by the attention information and the position on the display surface indicated by the new attention object position information, and the focus position control section gradually increases the transmittance of the focus from when the focus is displayed at the position that is located in-between the position on the display surface indicated by the object position information specified by the attention information and the position on the display surface indicated by the new attention object position information, to when the focus is displayed at the position on the display surface indicated by the new attention object position information.

12. An information processing system comprising:

an information input apparatus which includes
- an input section which accepts input of a vector on a display surface and
- a transmission section which transmits the vector the input of which is accepted by the input section; and an information processing apparatus which includes
- a display section which has the display surface and is capable of displaying information on the display surface,
- a storage section which stores pieces of object position information indicating positions of a plurality of objects on the display surface, and also stores cursor position information indicating a position of a cursor on the display surface and attention information for specifying at least one of the pieces of object position information,
- an object display control section which causes the plurality of objects to be displayed at the positions on the display surface indicated by the pieces of object position information,
- a reception section which receives the vector from the information input apparatus,
- a cursor position determination section which determines new cursor position information based on the vector received by the reception section,
- a cursor display control section which causes the cursor to be displayed at a position on the display surface indicated by the cursor position information stored in the storage section, and also causes the cursor to move to a position on the display surface indicated by the new cursor position information determined by the cursor position determination section,
- an attention object selection section which selects, from the pieces of object position information, information indicating the closest position from the position indicated by the new cursor position information as new attention object position information indicating a position of an object that is to be: newly attended to, and
- a focus position control section which causes a focus to be displayed at a position on the display surface indicated by the object position information specified by the attention information, and also causes the focus to move to a position on the display surface indicated by the new attention object position information, wherein, in moving the focus, the focus position control section causes the focus during stages of movement to be displayed on the display surface, and the focus position control section gradually decreases and then increases a transmittance of the focus in accordance with time elapses of the stages of movement, and wherein, in moving the focus, the focus position control section gradually decreases the transmittance of the focus from when the focus is displayed at the position on the display surface indicated by the object position information specified by the attention information, to when the focus is displayed at a position that is located in-between the position on the display surface indicated by the object position information specified by the attention information and the position on the display surface indicated by the new attention object position information, and the focus position control section gradually increases the transmittance of the focus from when the focus is displayed at the position that is located in-between the position on the display surface indicated by the object position information specified by the attention information and the position on the display surface indicated by the new attention object position information, to when the focus is displayed at the position on the display surface indicated by the new attention object position information.

* * * * *